United States Patent
Harada et al.

(10) Patent No.: US 10,512,067 B2
(45) Date of Patent: Dec. 17, 2019

(54) USER TERMINAL, RADIO BASE STATION, AND RADIO COMMUNICATION METHOD

(71) Applicant: NTT DOCOMO, INC., Tokyo (JP)

(72) Inventors: Hiroki Harada, Tokyo (JP); Kazuki Takeda, Tokyo (JP); Kazuaki Takeda, Tokyo (JP); Tooru Uchino, Tokyo (JP); Satoshi Nagata, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/548,460

(22) PCT Filed: Feb. 19, 2016

(86) PCT No.: PCT/JP2016/054785
§ 371 (c)(1),
(2) Date: Aug. 3, 2017

(87) PCT Pub. No.: WO2016/133183
PCT Pub. Date: Aug. 25, 2016

(65) Prior Publication Data
US 2018/0020445 A1    Jan. 18, 2018

(30) Foreign Application Priority Data

Feb. 19, 2015 (JP) .................. 2015-030785

(51) Int. Cl.
*H04W 72/04* (2009.01)
*H04J 1/00* (2006.01)
(Continued)

(52) U.S. Cl.
CPC .......... *H04W 72/0413* (2013.01); *H04J 1/00* (2013.01); *H04J 11/00* (2013.01); *H04L 1/1812* (2013.01);
(Continued)

(58) Field of Classification Search
CPC .............. H04L 1/1812; H04W 52/365; H04W 72/0413; H04W 72/14; H04W 88/02;
(Continued)

(56) References Cited

U.S. PATENT DOCUMENTS

2014/0161002 A1    6/2014  Gauvreau et al.
2015/0131494 A1*   5/2015  He .................. H04B 7/0469
                                                            370/280

(Continued)

FOREIGN PATENT DOCUMENTS

EP          3145256 A1    3/2017

OTHER PUBLICATIONS

International Search Report issued in corresponding application No. PCT/JP2016/054785 dated Mar. 15, 2016 (4 pages).

(Continued)

*Primary Examiner* — Robert J Lopata
(74) *Attorney, Agent, or Firm* — Osha Liang LLP

(57) ABSTRACT

The present invention is designed to allow adequate communication even when the number of CCs that can be configured in a user terminal is expanded from that of existing systems and/or when CA is executed using unlicensed CCs. A user terminal communicates with a radio base station by means of carrier aggregation using a plurality of component carriers (CCs), and has a receiving section that receives DL signals transmitted from each CC, a transmission section that transmits UL signals, and a control section that controls transmission operations in the transmission section, and, when a plurality of CCs, including at least a first CC, which corresponds to a primary CC of an existing system, and a third CC, which is different from the first CC and a second CC that corresponds to a secondary CC of the existing system, are configured, the control section applies, (Continued)

to the third CC, UL signal transmission operations that are different from those of the second CC.

3 Claims, 17 Drawing Sheets

(51) Int. Cl.
*H04J 11/00* (2006.01)
*H04W 16/14* (2009.01)
*H04W 72/12* (2009.01)
*H04L 1/18* (2006.01)
*H04W 52/36* (2009.01)
*H04W 72/14* (2009.01)
*H04W 88/02* (2009.01)
*H04W 88/08* (2009.01)
*H04W 74/08* (2009.01)

(52) U.S. Cl.
CPC ......... *H04W 16/14* (2013.01); *H04W 52/365* (2013.01); *H04W 72/04* (2013.01); *H04W 72/12* (2013.01); *H04W 72/14* (2013.01); *H04W 74/08* (2013.01); *H04W 88/02* (2013.01); *H04W 88/08* (2013.01)

(58) Field of Classification Search
CPC ..... H04W 88/08; H04W 72/04; H04W 72/12; H04W 76/00; H04B 7/2121; H04J 2203/0069; H04Q 2213/394
USPC ......................................................... 370/329
See application file for complete search history.

(56) References Cited

U.S. PATENT DOCUMENTS

| | | | |
|---|---|---|---|
| 2016/0269104 A1* | 9/2016 | Lee ...................... | H04B 7/2656 |
| 2016/0330676 A1* | 11/2016 | Thangarasa ........... | H04W 76/14 |
| 2017/0013565 A1* | 1/2017 | Pelletier .............. | H04W 52/146 |
| 2017/0078983 A1* | 3/2017 | Ahn ...................... | H04W 52/34 |
| 2017/0251477 A1* | 8/2017 | Chung ................. | H04J 11/0069 |
| 2018/0014255 A1* | 1/2018 | Pelletier .............. | H04W 52/146 |
| 2018/0048498 A1* | 2/2018 | Stern-Berkowitz ......................... H04L 5/0048 |

OTHER PUBLICATIONS

Written Opinion of the International Searching Authority issued in corresponding application No. PCT/JP2016/054785 dated Mar. 15, 2016 (4 pages).

Microsoft Corporation, "Discussion on DL and UL transmissions for licensed-assisted access using LTE"; 3GPP TSG-RAN WG1 Meeting #80, R1-150631; Athens, Greece; Feb. 9-13, 2015 (4 pages).

Ericsson, "Discussion on UL HARQ handling in LAA"; 3GPP TSG RAN WG1 Meeting #80, R1-150583; Athens, Greece; Feb. 9-13, 2015 (2 pages).

Intel Corporation, "On the LAA uplink: scheduling, LBT, and HARQ"; 3GPP TSG RAN WG1 Meeting #80, R1-150507; Athens, Greece; Feb. 9-13, 2015 (4 pages).

3GPP TS 36.300 V8.12.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)"; Mar. 2010 (149 pages).

Office Action issued in counterpart Japanese Patent Application No. 2017-500744 dated Apr. 17, 2018 (5 Pages).

Extended European Search Report issued in corresponding European Patent Application No. 16752569.0, dated Aug. 29, 2018 (11 pages).

Alcatel-Lucent et al., "PUCCH on SCell for CA enhancement", 3GPP TSG-RAN WG2 Meeting #80, R1-150167, Athens, Greece, Feb. 9-13, 2015 (5 pages).

HTC, "Discussion on HARQ for LAA-LTE", 3GPP TSG RAN WG1 Meeting #80, R1-150525, Athens, Greece, Feb. 9-13, 2015 (2 pages).

Office Action issued in counterpart European Patent Application No. 16752569.0, dated Jul. 11, 2019 (7 Pages).

* cited by examiner

USER TERMINAL, RADIO BASE STATION, AND RADIO COMMUNICATION METHOD

TECHNICAL FIELD

The present invention relates to a user terminal, a radio base station and a radio communication method in next-generation mobile communication systems.

BACKGROUND ART

In the UMTS (Universal Mobile Telecommunications System) network, the specifications of long term evolution (LTE) have been drafted for the purpose of further increasing high speed data rates, providing lower delays and so on (see non-patent literature 1). Successor system of LTE—referred to as "LTE-advanced" (also referred to as "LTE-A")—have been under study for the purpose of achieving further broadbandization and increased speed beyond LTE, and the specifications thereof have been drafted as LTE Rel. 10 to 12.

The system band in LTE Rel. 10 to 12 includes at least one component carrier (CC), where the LTE system band constitutes one unit. Such bundling of a plurality of CCs into a wide band is referred to as "carrier aggregation" (CA). Also, in LTE Rel. 12 supports dual connectivity (DC), in which a user terminal communicates by using CCs that are controlled separately by different radio base stations (schedulers).

In CA/DC in the above-mentioned successor systems of LTE (LTE Rel. 10 to 12), the maximum number of CCs that can be configured per user terminal (UE) is configured to five. With LTE of Rel. 13 and later versions, which are more advanced successor systems of LTE, studies are in progress to mitigate the limit of the number of CCs that can be configured in a user terminal and to configure six or more CCs (for example, 32 CCs), in order to makes possible more flexible and faster communication.

The specifications of LTE Rel. 8 to 12 have been drafted assuming exclusive operations in frequency bands that are licensed to operators—that is, licensed bands. As licensed bands, for example, 800 MHz, 2 GHz and/or 1.7 GHz are used.

Furthermore, for future radio communication systems (Rel. 13 and later versions), a system ("LTE-U" (LTE Unlicensed)) to run LTE systems not only in frequency bands licensed to communications providers (operators) (licensed bands), but also in frequency bands where license is not required (unlicensed bands), is under study. In particular, a system (LAA: Licensed-Assisted Access) to run an unlicensed band assuming the presence of a licensed band is also under study. Note that systems that run LTE/LTE-A in unlicensed bands may be collectively referred to as "LAA." A licensed band is a band in which a specific provider is allowed exclusive use, and an unlicensed band is a band which is not limited to a specific provider, and in which radio stations can be provided.

An unlicensed band may be run without even synchronization, coordination and/or cooperation between different operators and/or non-operators, and there is a threat that significant cross-interference is produced in comparison to a licensed band. Consequently, when an LTE/LTE-A system (LTE-U) is run in an unlicensed band, it is desirable if the LTE/LTE-A system operates by taking into account the cross-interference with other systems that run in unlicensed bands such as Wi-Fi, other operators' LTE-U, and so on. In order to prevent cross-interference in unlicensed bands, a study is in progress to allow an LTE-U base station/user terminal to perform "listening" before transmitting a signal and restrict the transmission depending on the result of listening.

Also, for unlicensed bands, for example, the 2.4 GHz band and the 5 GHz band where Wi-Fi (registered trademark) and Bluetooth (registered trademark) can be used, and the 60 GHz band where millimeter-wave radars can be used are under study for use. Studies are in progress to use these unlicensed bands in small cells.

CITATION LIST

Non-Patent Literature

Non-Patent Literature 1: 3GPP TS 36.300 "Evolved Universal Terrestrial Radio Access (E-UTRA) and Evolved Universal Terrestrial Radio Access Network (E-UTRAN); Overall description; Stage 2"

SUMMARY OF INVENTION

Technical Problem

CA/DC for use in systems according to LTE Rel. 10 to 12 supports one primary cell ("PCell," "PCC," etc.) and maximum four secondary cells ("SCells," "SCCs," etc.) as cells (CCs) to configure in a user terminal. In this way, in CA for existing systems (LTE Rel. 10 to 12), the number of CCs that can be configured per user terminal (UE) is limited to maximum five.

Meanwhile, when the number of CCs that can be configured in a user terminal is expanded to six or above (for example, 32 CCs) in more advanced successor systems of LTE (for example, LTE Rel. 13 and later versions), the load of the user terminal might grow following the increase of the number of CCs. For example, when an additional CC ("expanded CC") is configured in a user terminal as an SCC, the load that is required of the user terminal for the UL signal transmission operations for each SCell is likely to grow.

Also, when an unlicensed CC is configured in a user terminal as an SCC (for example, an as an expanded CC), cases might occur where, depending on the result of listening (the result of LBT), the user terminal is unable to transmit and receive signals with the unlicensed CC on a regular basis. In this case, if the user terminal tries to perform transmission operations for UL transmission and so on for each unlicensed CC as for SCCs (SCells) of existing systems, there is a threat of making adequate communication difficult.

The present invention has been made in view of the above, and it is therefore an object of the present invention to provide a user terminal, a radio base station and a radio communication method that allow adequate communication even when the number of CCs that can be configured in a user terminal is expanded from that of existing systems and/or when CA is executed using unlicensed CCs.

Solution to Problem

A user terminal according to one aspect of the present invention provides a user terminal that communicates with a radio base station by means of carrier aggregation using a plurality of component carriers (CCs), and this user terminal has a receiving section that receives DL signals transmitted from each CC, a transmission section that transmits UL signals, and a control section that controls transmission operations in the transmission section, and, when a plurality of CCs, including at least a first CC, which corresponds to a primary CC of an existing system, and a third CC, which is different from the first CC and a second CC that corresponds to a secondary CC of the existing system, are configured, the control section applies, to the third CC, UL signal transmission operations that are different from those of the second CC.

Advantageous Effects of Invention

According to the present invention, communication can be carried out adequately even when the number of CCs that can be configured in a user terminal is expanded from that of existing systems and/or when CA is executed using unlicensed CCs.

DESCRIPTION OF EMBODIMENTS

Figure 1:
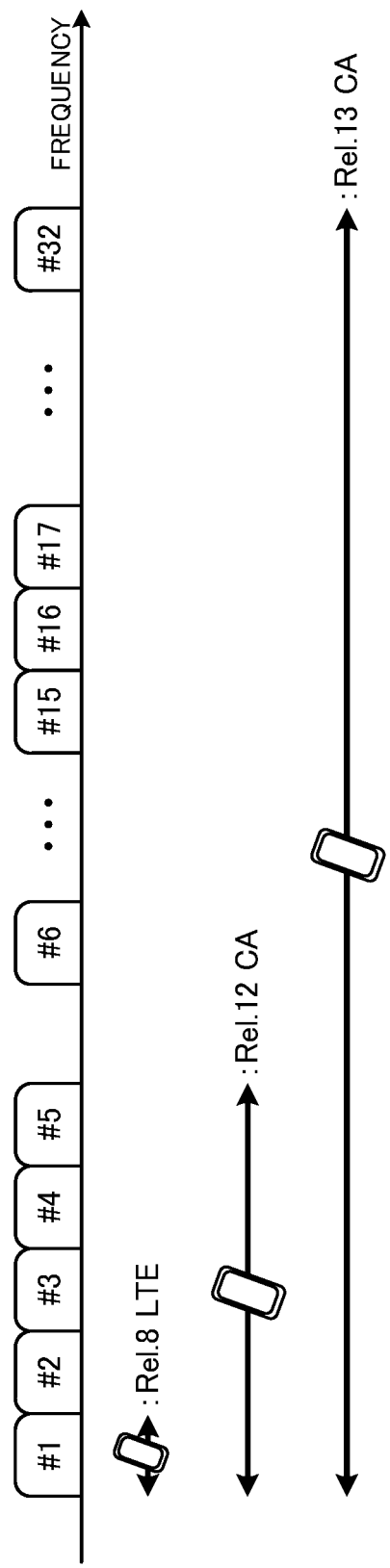
FIG. 1 is a diagram to explain an overview of carrier aggregation in successor systems of LTE.

FIG. 1 is a diagram to explain carrier aggregation (CA). As shown in FIG. 1, in CA of existing systems (up to LTE Rel. 12), maximum five component carriers (CCs) (CC #1 to CC #5), where the system band of LTE Rel. 8 constitutes one unit, are bundled. That is, in carrier aggregation up to LTE Rel. 12, the number of CCs that can be configured in a user terminal (UE: User Equipment) is limited to maximum five (one primary cell and maximum four secondary cells).

The primary cell (PCell, PCC, etc.) refers to the cell that manages RRC connection, handover and so on when CA/DC is used, and is also a cell that requires UL communication in order to receive data and feedback signals from terminals. The primary cell is always configured in the uplink and the downlink. A secondary cell (SCell, SCC, etc.) refers to another cell that is configured apart from the primary cell when CA/DC is used. Secondary cells may be configured in the downlink alone, or may be configured in both the uplink and the downlink at the same time.

Meanwhile, in more advanced successor systems of LTE (for example, LTE Rel. 13 and later versions), a study is in progress to soften the limit of the number of CCs that can be configured per user terminal, and use enhanced carrier aggregation (CA enhancement), in which six or more CCs (cells) are configured. For example, as shown in FIG. 1, when 32 CCs (CC #1 to CC #32) are bundled, a bandwidth of maximum 640 MHz can be secured. In this way, more flexible and faster radio communication is expected to be made possible by increasing the number of CCs that can be configured in a user terminal.

Furthermore, for more advanced successor systems of LTE (for example, Rel. 13 and later versions), systems to run LTE systems not only in frequency bands licensed to communications providers (operators) (licensed bands), but also in frequency bands where license is not required (unlicensed bands), are under study.

The premise of existing LTE/LTE-A is that it is run in licensed bands, and therefore each operator is allocated a different frequency band. However, unlike a licensed band, an unlicensed band is not limited to use by a specific provider. When run in an unlicensed band, LTE may be carried out without even synchronization, coordination and/or cooperation between different operators and/or non-operators. In this case, a plurality of operators and/or systems share and use the same frequency in the unlicensed band, and therefore there is a threat of producing cross-interference.

Figure 2:
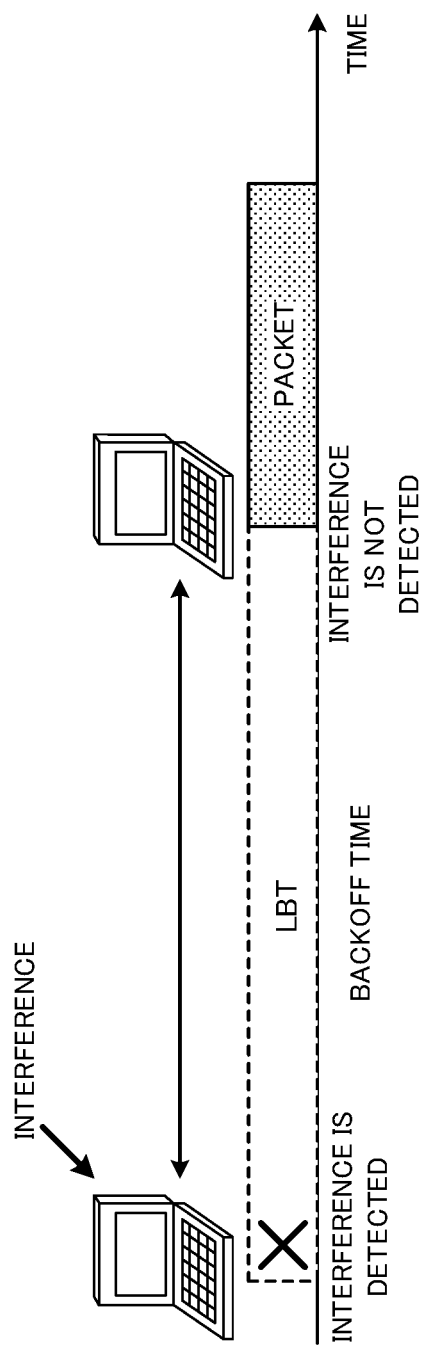
FIG. 2 is a diagram to show an example of transmission control for use when listening (LBT) is used.

In Wi-Fi systems that are run in unlicensed bands, carrier sense multiple access/collision avoidance (CSMA/CA), which is based on the mechanism of LBT (Listen Before Talk), is employed. To be more specific, for example, a method, whereby each transmission point (TP), access point (AP), Wi-Fi terminal (STA: Station) and so on perform "listening" (CCA: Clear Channel Assessment) before carrying out transmission, and carries out transmission only when there is no signal beyond a predetermined level, is used. When there is a signal to exceed a predetermined level, a waiting time (backoff time) is provided, which is determined on a random basis, and, following this, listening is performed again (see FIG. 2).

So, for LTE/LTE-A systems that are run in unlicensed bands (for example, LAA), too, a study is in progress to use transmission control based on the result of listening. For example, a radio base station and/or a user terminal perform listening (LBT) before transmitting signals in an unlicensed band cell, and checks whether other systems (for example, Wi-Fi) and/or other operators are communicating. If, as a result of listening, the received signal intensity from other systems and/or other LAA transmission points is equal to or lower than a predetermined value, the radio base station and/or the user terminal judges that the channel is in the idle state (LBT_idle) and transmits signals. On the other hand, if, as a result of listening, the received signal intensity from other systems and/or other LAA transmission points is greater than the predetermined value, the radio base station and/or the user terminal judges that the channel is in the busy state (LBT_busy), and limits signal transmission.

Note that "listening" herein refers to the operation which radio base stations and/or user terminals perform before transmitting signals in order to check/measure whether or not signals to exceed a predetermined level (for example, predetermined power) are being transmitted from other transmission points. Also, this "listening" performed by radio base stations and/or user terminals may be referred to as "LBT" (Listen Before Talk), "CCA" (Clear Channel Assessment), and so on. As to how to limit signal transmission based on the result of LBT, possible methods include making a transition to another carrier by way of DFS (Dynamic Frequency Selection), applying transmission power control (TPC), holding (stopping) signal transmission, and so on.

In this way, by using LBT in communication in LTE/LTE-A (for example, LAA) systems that are run in unlicensed bands, it becomes possible to reduce the interference with other systems and/or the like.

Now, as shown in FIG. 1, expanding the number of CCs is effective to widen the band in carrier aggregation (LAA: License-Assisted Access) between licensed bands and unlicensed bands. For example, five licensed band CCs (=100 MHz) and fifteen unlicensed band CCs (=300 MHz) are bundled, a bandwidth of 400 MHz can be secured.

Figure 3:
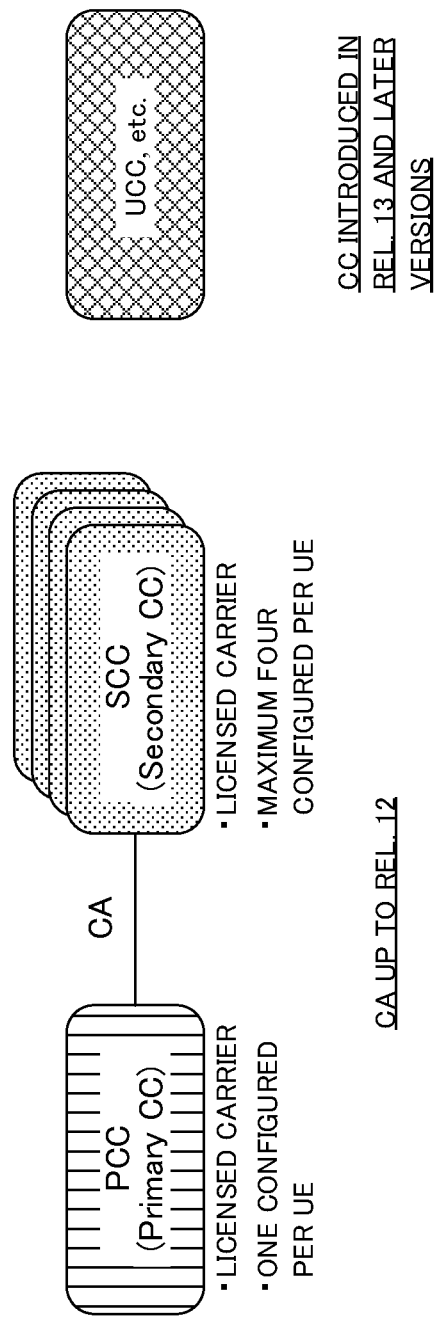
FIG. 3 is a diagram to explain CA using a PCC and SCCs of an existing system, and an unlicensed CC.

Meanwhile, when the number of CCs that can be configured in a user terminal is expanded, and/or when CA is executed using an unlicensed CC (UCC), how to configure the expanded CCs and/or the unlicensed CC (UCC) and how to control the user terminal's operations is the problem (see FIG. 3).

Figure 4:
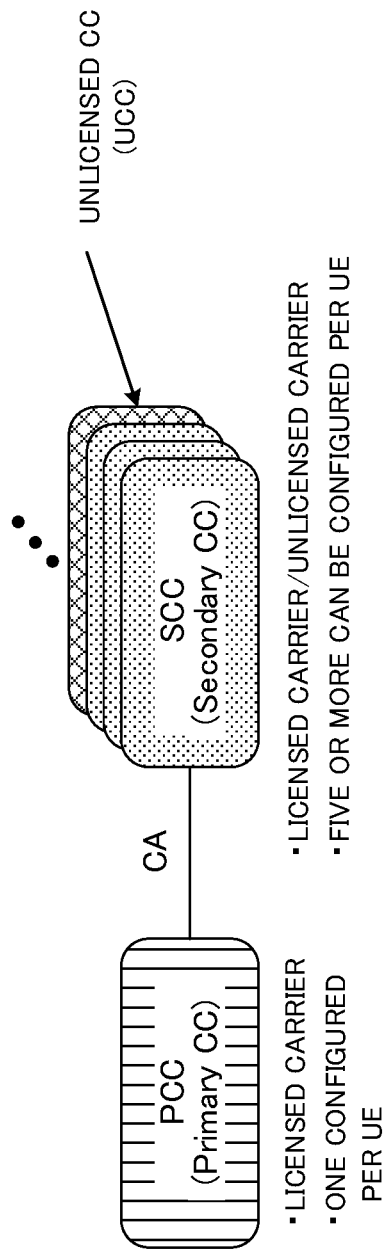
FIG. 4 is a diagram to show an example of a case where unlicensed CCs are configured as SCCs.

For example, as shown in FIG. 4, it may be possible to execute CA, assuming that the unlicensed CC (UCC: Unlicensed Component Carrier) is a secondary cell (SCC) of an existing system. Note that, in FIG. 4, the unlicensed CC (UCC) may be configured as an expanded CC as well.

However, the transmission/non-transmission (ON/OFF) state in the unlicensed CC changes dynamically, because pre-transmission LBT is the premise of unlicensed carriers. Consequently, there is a threat that the user terminal is unable to transmit signals on a regular basis as in the PCC or in active-state SCCs. On the other hand, in UCCs, although signals are not transmitted on a regular basis, signals start being transmitted or received soon depending on the result of LBT, so that it is necessary to control user terminals to be able to transmit and receive these signals. In this way, the present inventors have focused on the fact the user terminal operations that are required by UCCs are different from those required by non-activate state SCCs.

Also, since an unlicensed carrier allows co-presence with other systems, the quality varies significantly compared to a licensed carrier, and the reliability of communication is highly likely to deteriorate. Consequently, in LAA, it may be possible to support communication in an unlicensed carrier by using a licensed carrier (for example, report LBT results by using the licensed carrier). In this case, the user terminal operations for unlicensed CCs and existing SCCs may be different.

So, the present inventors have come up with the idea of operating/controlling user terminals differently between expanded CCs and unlicensed CCs, and existing PCCs and SCCs. Also, the present inventors have come up with the idea of configuring a new CC that is different from a PCC or an SCC, and configuring/reporting this in a user terminal so as to enable the user terminal to distinguish the CC (for example, a UCC), to which different operations/control are applied, from the PCCs and SCCs of existing systems (Rel. 10 to 12).

Figure 5:
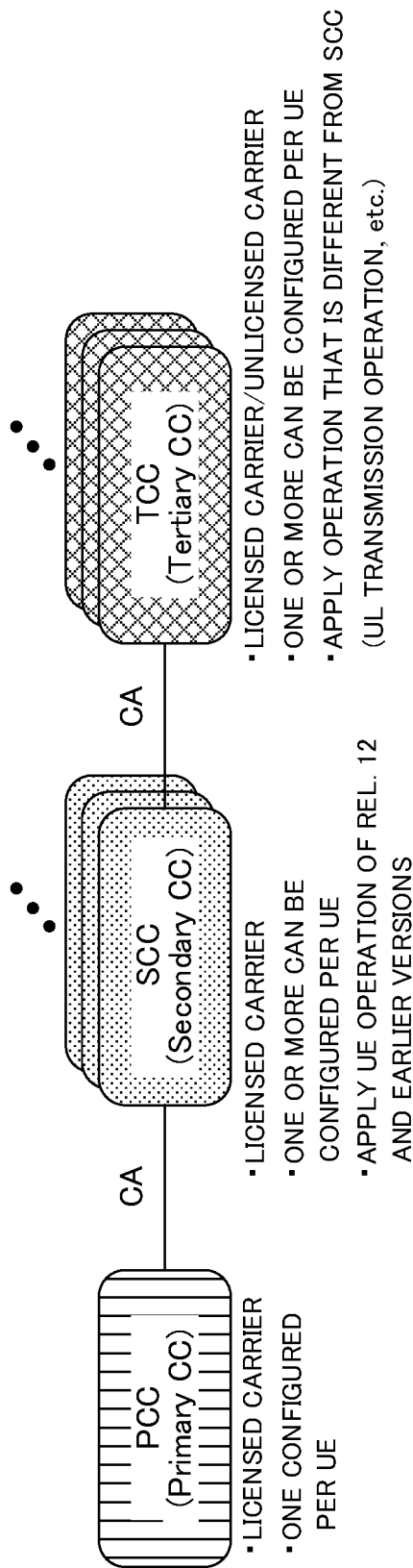
FIG. 5 is a diagram to show an example of carrier aggregation in which TCCs are used.

To be more specific, the present inventors have come up with the idea of defining expanded CCs and/or UCCs differently from existing PCCs and SCCs, and applying different control/operations from those of existing SCCs (see FIG. 5). In this description, a CC, to which different control/operations from those of the PCCs and SCCs of existing systems (Rel. 10 to Rel. 12) are applied, will be hereinafter referred to as a "TCC" (Tertiary CC), a "TCell," a "third CC" or a "third cell" (hereinafter "TCC"). A TCC can be constituted by a licensed CC and/or an unlicensed CC.

A user terminal, in which a TCC is configured, can apply different control/operations from those of SCCs, to this TCC (see FIG. 5). For example, the user terminal applies UL transmission operations that are different from those of PCCs and SCCs, to the TCC (including, for example, saving unnecessary UL transmission operations, UL HARQ operation, UL transmission operation to take LBT results into consideration, LBT-based reporting operation, and so on).

By this means, even when many CCs are configured in a user terminal, it is still possible to reduce the growth of the user terminal's load by applying simple control and/or measurement operations to the TCCs. Also, when an unlicensed CC is configured as a TCC in a user terminal, by applying UL transmission operations that take LBT into account (and that are therefore different from those applied to PCCs and SCCs) to the TCC, it becomes possible to reduce wrong operations that arise from LBT results, and allow adequate communication.

Figure 6:
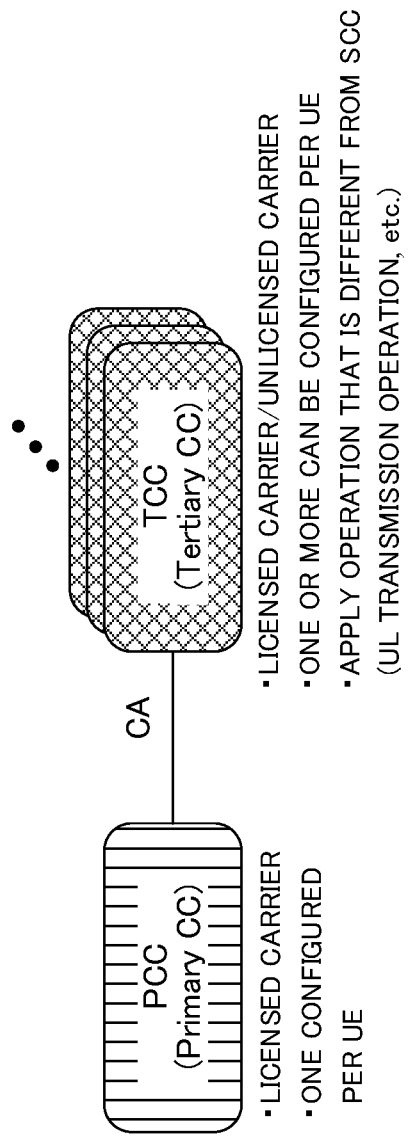
FIG. 6 is a diagram to show another example of carrier aggregation in which TCCs are used.

Now, the present embodiment will be described below in detail. Note that, although cases will be described in the following description where one or more licensed CC and/or unlicensed CCs are configured as TCCs, this is by no means limiting. For example, TCCs can be constituted by unlicensed CCs alone. Also, with the present embodiment, it is equally possible to configure a PCC (PCell) and a TCC (TCell) in a user terminal and execute CA/DC (that is, SCCs (SCells) are not configured) (see FIG. 6). Also, it is possible to configure five or more CCs in a user terminal as SCCs (SCells). Also, in licensed bands, UL LBT and/or DL LBT can be used.

FIRST EXAMPLE

An example case will be described with a first example where a user terminal saves unnecessary UL transmission operations.

Figure 7:
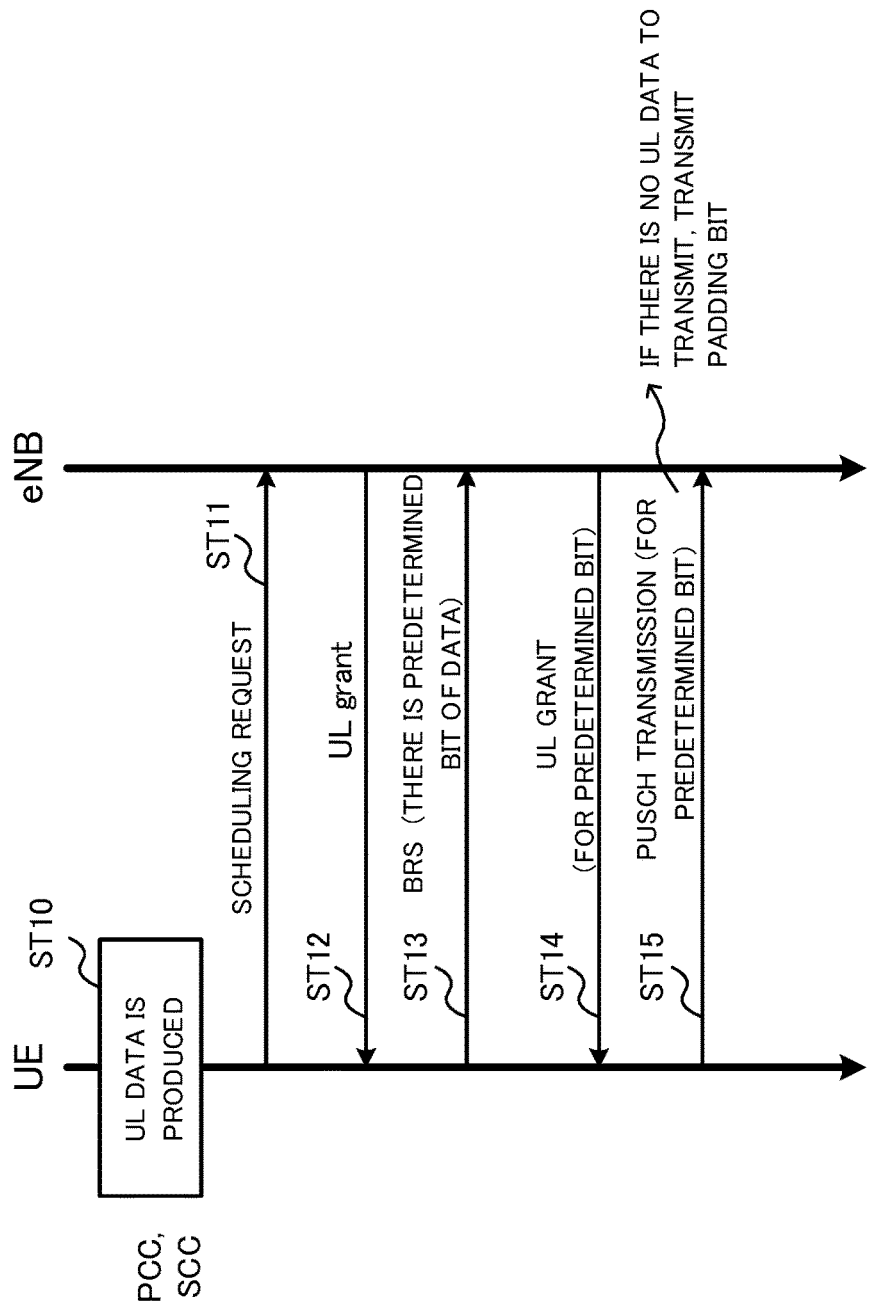
FIG. 7 is a diagram to show an example of a UL transmission operation method.

In PCCs and SCCs of existing systems (Rel. 10 to 12), a user terminal transmits UL data when downlink control information (UL grant) to command UL data (PUSCH) allocation is received from a radio base station. Now, an example of PUSCH transmission operations in an existing system will be described below with reference to FIG. 7.

When uplink data to transmit (UL data) is produced (ST10), a user terminal (UE) sends a scheduling request to a radio base station (eNB) (ST11). If the user terminal does not have dedicated UL resources in ST11, the user terminal starts the random access procedures. In response to the scheduling request from the user terminal, the radio base station transmits a UL grant that commands resource allocation for uplink data transmission (ST12). Based on this UL grant, the user terminal transmits a buffer status report (BSR), which indicates the volume of UL data to be transmitted (ST13). Upon receiving the BSR, the radio base station reports a UL grant that indicates predetermined bits of uplink resource allocation, to the user terminal (ST14), so that the user terminal can transmit UL data within the limited number of bits by using a PUSCH that is allocated (ST15).

In this way, this existing system (Rel. 10 to 12) provides that, when uplink data to transmit is produced, the user terminal should report a buffer status report (BSR) that shows the volume of remaining uplink data (buffer size) to the radio base station.

However, when the buffer status report (BSR) that is transmitted from the user terminal and that shows the volume of UL data to transmit is lost (ST13), cases might occur where the radio base station estimates the volume of UL data in accurately. Alternatively, cases might also occur where the user terminal discards data on the user terminal end following the expiration of a data-discarding timer. In this case, the situation arises where the user terminal receives a UL grant from the radio base station in ST14 and nevertheless has no data to transmit in ST15.

The existing system provides that, when a UL grant is received from the radio base station (ST14) and yet there is no data to transmit in the user terminal, the user terminal should carry out UL transmission (PUSCH transmission) in ST15 by using padding bits (free bits).

When the user terminal carries out UL transmission operations (padding bit transmission) for TCCs in the same way as for PCCs/SCCs, the user terminal's load such as battery consumption and others grows. Also, the above-noted loss of a BSR occurs when, for example, the user terminal is commanded to transmit a BSR in an unlicensed band. When the user terminal judges, based on the result of LBT, that there is a nearby interfering station, the user terminal stops transmitting BSRs. This makes the radio base station unable to catch BSRs, there is a possibility that the radio base station allocates UL resources to the user terminal, assuming a large volume of UL data.

In this way, when BSRs are reported by using a TCC with which the channel quality varies significantly compared to an SCC and others, the possibility of losing the BSRs transmitted from the user terminal increases, and the opportunities to transmit padding bits might increase. Also, if the TCC is an unlicensed band, there is a threat of causing interference in the surroundings even when padding bits are transmitted.

Figure 8:
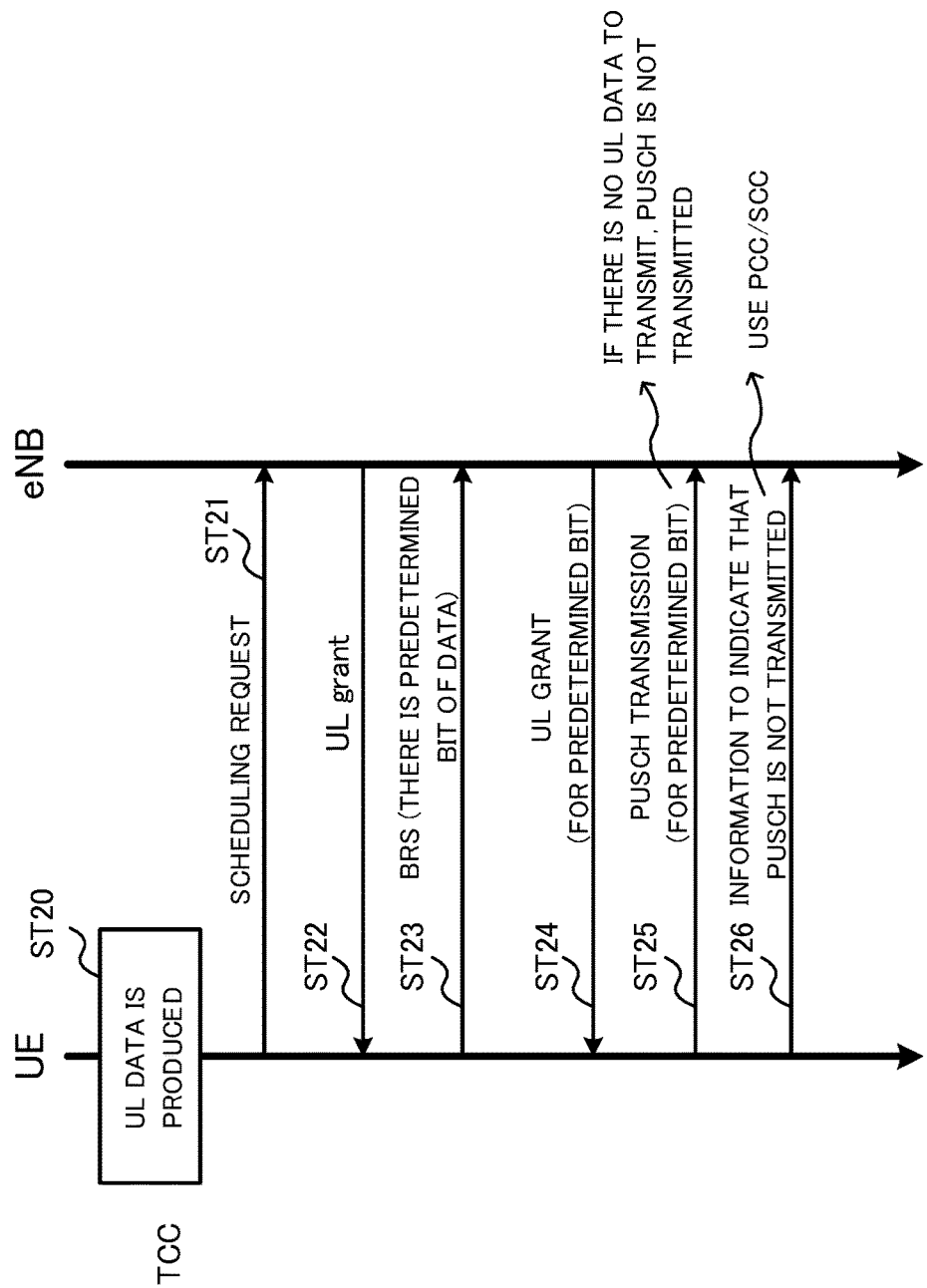
FIG. 8 is a diagram to show an example of a UL transmission operation method in a TCC.

So, according to the present embodiment, even when uplink data (PUSCH) transmission is commanded by a UL grant in a TCC, a user terminal can be controlled not to carry out transmission (padding bit transmission) in the TCC if there is no UL data to transmit. That is, the user terminal saves unnecessary UL transmission operations by applying different UL transmission operations from those of PCCs and SCCs, to the TCC. An example of a user terminal operation method for use when UL data is transmitted by using a TCC is shown in FIG. 8.

When uplink data to transmit (UL data) is produced (ST20), a user terminal (UE) sends a scheduling request to a radio base station (ST21). When the user terminal does not have dedicated UL resources in ST21, the user terminal starts the random access procedures. In response to the scheduling request from the user terminal, the radio base station transmits a UL grant to command resource allocation for uplink data transmission (ST22). Based on this UL grant, the user terminal transmits a buffer status report (BSR), which indicates the volume of UL data to be transmitted (ST23). Upon receiving the BSR, the radio base station reports a UL grant that indicates predetermined bits of uplink resource allocation for the TCC, to the user terminal (ST24), so that the user terminal can transmit UL data within the limited number of bits by using the PUSCH of the TCC that is allocated (ST25).

If the situation arises where the user terminal receives a UL grant from the radio base station in ST24 and nevertheless has no data to transmit in ST25, the user terminal can be controlled not to carry out UL transmission (padding bit transmission) in the TCC in ST25.

Alternatively, when the user terminal receives a UL grant from the radio base station in ST24, and the volume of UL data to transmit is equal to or lower than a predetermined value in ST25, this user terminal can be controlled not to carry out UL transmission in the TCC in ST25 (UL transmission in which padding bits are predominant). This predetermined value may be a value that is determined in advance, or may be a value that is configured in the user terminal by higher layer signaling such as RRC signaling. Here, instead of controlling whether or not to carry out UL transmission in the TCC by defining a predetermined value with respect to the volume of UL data, it is also possible to control whether or not to carry out UL transmission in the TCC by providing a predetermined value with respect to the ratio between the volume of UL resources allocated and the volume of UL data. For example, when the volume of UL data to actually transmit is less than 1% of the volume of UL resources allocated, the user terminal can operate not to carry out this UL transmission in the TCC.

Furthermore, when the user terminal does not transmit UL data based on a UL grant in the TCC, the user terminal may report to the radio base station that there is no transmission data to correspond to that UL grant (ST26). In this case, the user terminal may sent information to indicate that there is no transmission data that corresponds to the UL grant, by using the UL of the PCC and/or SCCs (for example, the PUSCH).

By this means, it is possible to prevent the user terminal from making unnecessary UL transmission in the TCC. Also, when the TCC is an unlicensed band, it is also possible to reduce the impact upon the surroundings by saving unnecessary UL transmission. Also, by sending a report to the radio base station when no transmission data correspond to a UL grant, it is possible to allow the radio base station end to know, appropriately, that the user terminal has no UL data to transmit.

SECOND EXAMPLE

UL HARQ operations by a user terminal in a TCC will be described below with a second example.

In an existing system (Rel. 10 to 12), a user terminal employs synchronous UL HARQ based on a PHICH (Physical Hybrid-ARQ Indicator Channel) that is reported from a radio base station. An example of synchronous UL HARQ in an existing system is shown in FIG. 9.

Figure 9:
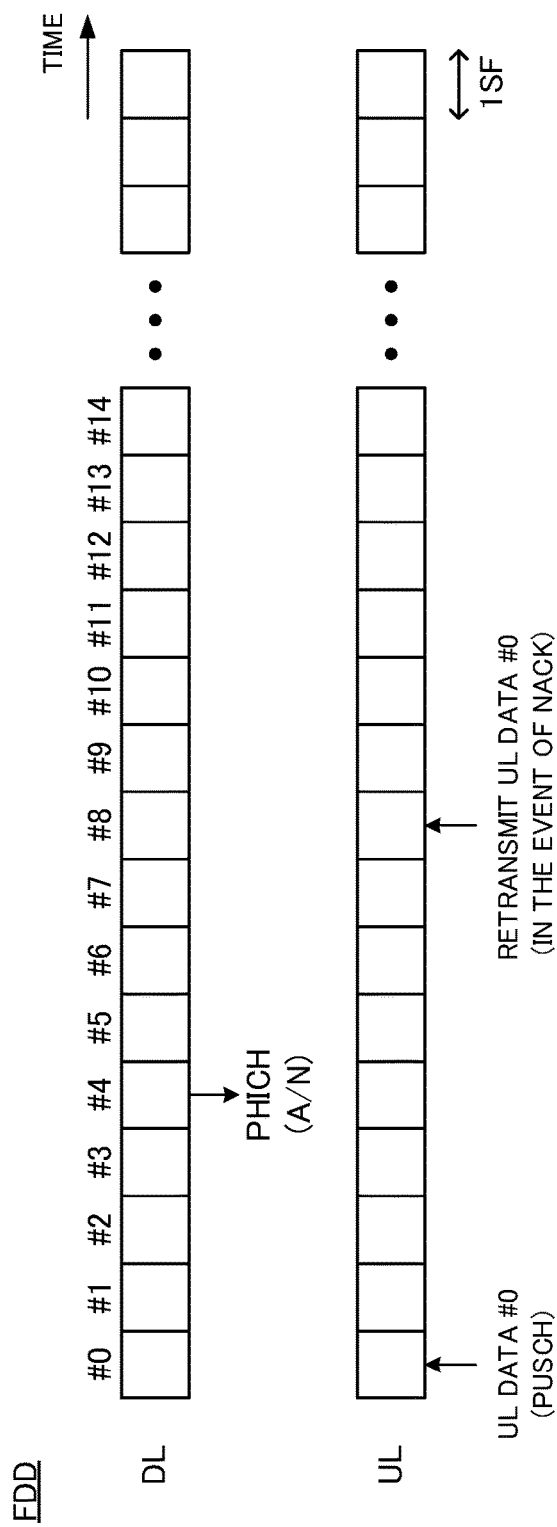
FIG. 9 is a diagram to show an example of synchronous UL HARQ.

FIG. 9 shows a case where a user terminal transmits UL data (for example, the PUSCH) in subframe #0. In this case, a radio base station judges whether or not UL data (PUSCH) that is transmitted from the user terminal is received adequately, and transmits a PHICH for retransmission control (ACK/NACK) to the user terminal a predetermined timing later. The radio base station can make the timing to transmit the PHICH, for example, four subframes later in FDD (here, subframe #4).

When the PHICH that is transmitted from the radio base station is an ACK, the user terminal transmits new UL data, and, when the PHICH is a NACK, the user terminal applies retransmission control to the UL data. When retransmitting the UL data, the user terminal retransmits the UL data a predetermined timing after the PHICH is received. The user terminal can make the predetermined timing four subframes later (here, subframe #8) in FDD.

In this way, in the existing system (Rel. 10 to 12), the user terminal and the radio base station execute UL data retransmission control (UL HARQ) in predetermined timings (synchronous HARQ). Also, in TDD, too, the user terminal and the radio base station can execute UL data retransmission control (UL HARQ) in predetermined timings (synchronous HARQ).

On the other hand, in an unlicensed band, cases occur where a user terminal is unable to carry out UL retransmission in a predetermined timing depending on the result of LBT. For example, when the user terminal is going to retransmit UL data based on the PHICH (NACK) and yet a limitation is placed on this retransmission based on the result of LBT executed prior to this UL data retransmission (that is, the channel is in the busy state (LBT_busy)), the UL data cannot be retransmitted in a predetermined timing. Consequently, in an unlicensed band (for example, in a TCC), the user terminal has difficulty employing synchronous HARQ as in PCCs and SCCs of existing systems.

So, according to the present embodiment, a user terminal employs asynchronous HARQ in a TCC. In this case, the user terminal can operate without reading (detecting) ACKs/NACKs for the PHICH (synchronous HARQ operation) (see FIG. 10). For example, when a UL grant is transmitted from a TCC, or when a UL grant (CIF (Carrier Indicator Field)) that is transmitted in a PCC or an SCC indicates a TCC (UL cross carrier scheduling), the user terminal can operate without reading (detecting) the PHICH.

Figure 10:
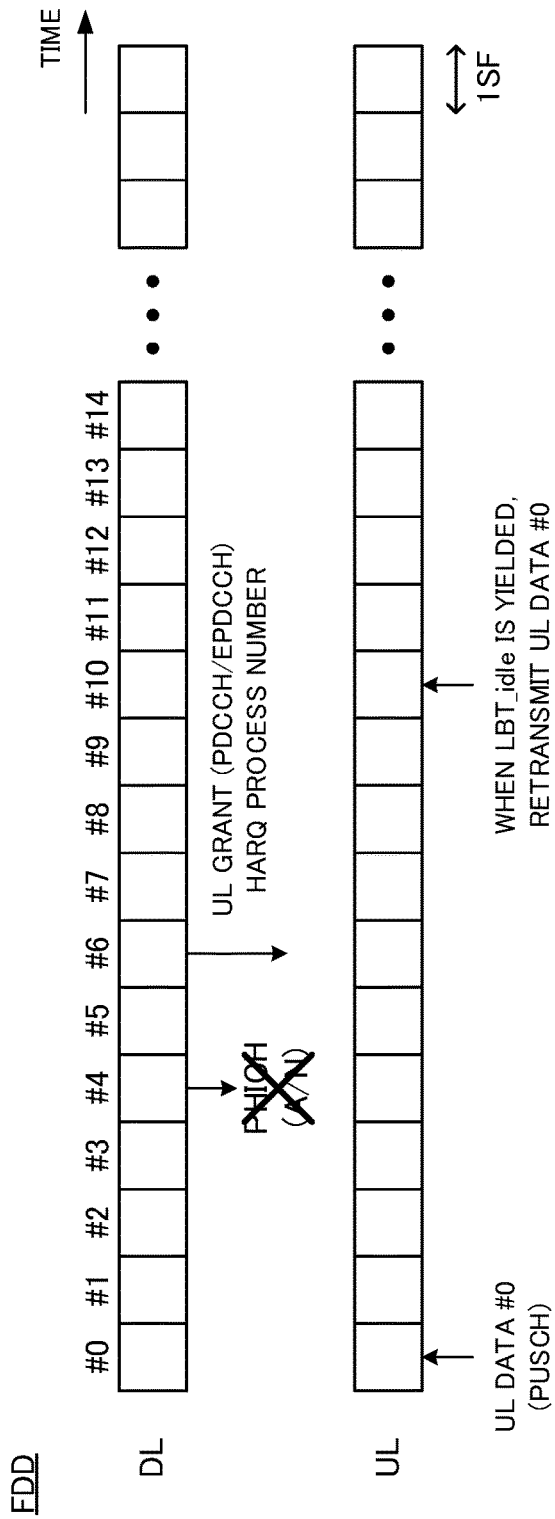
FIG. 10 is a diagram to show an example of asynchronous UL HARQ in TCC.

FIG. 10 shows a case where, in a TCC, a user terminal transmits UL data (for example, the PUSCH) in subframe #0. In this case, the radio base station judges whether or not UL data (PUSCH) that is transmitted from the user terminal is received adequately, and, if retransmission control is needed, sends out a report to that effect. As for the method of sending a report about retransmission control to the user terminal, it is possible to send a UL grant using the PDCCH of the TCC, or send a UL grant using the PUCCH of another CC (PCC or SCC) (cross carrier scheduling).

In FIG. 10, the radio base station transmits a UL grant for retransmission control to the user terminal in a predetermined timing. The predetermined timing may be four subframes before the subframe where the retransmitting UL data is allocated (in FIG. 10, subframe #6), or may be a different timing. The user terminal controls the retransmission of the UL data based on the UL grant, not the PHICH transmitted from the radio base station. In this case, the user terminal can execute LBT after the UL grant is received, and control the UL data transmission timing based on the result of this LBT (asynchronous UL HARQ).

For example, the user terminal can receive the UL grant and then execute LBT in the TCC, and retransmits the UL data in the first subframe that is capable of transmission (LBT_idle) (in FIG. 10, subframe #10).

In this way, the user terminal can control UL data retransmission according to UL grants and LBT results in a TCC (asynchronous UL HARQ). Note that, although a case has been shown with FIG. 10 where the TCC uses FDD, it is equally possible to apply asynchronous UL HARQ when the TCC uses TDD.

Also, when asynchronous HARQ is employed, it is possible to attach HARQ process numbers (HPNs: HARQ Process Numbers) to a UL grant for asynchronous HARQ. An HARQ process number indicates the number of the HARQ process for one transport block (TB). For example, in the case shown in FIG. 10, the radio base station can include the HARQ process numbers that correspond to UL data #0 in a UL grant and transmit this to the user terminal.

The HPN bit field to configure in a UL grant can be made, for example, three bits. With three bits, maximum eight HARQ process numbers can be indicated, and the individual HARQ processes can be carried out in parallel. Also, by including information about retransmitting UL data (here, HARQ process numbers) in a UL grant, the user terminal can accurately know which UL data should be retransmitted.

Now, UL HARQ operation methods for a user terminal in which a TCC is configured will be described below in greater detail. Note that although cases will be shown in the following description where UL cross carrier scheduling from a PCC and/or an SCC to a TCC is configured in a user terminal, the present embodiment is by no means limited to this. For example, the present embodiment is equally applicable to cases where a PDCCH trigger is sent from a PCC and/or an SCC to a TCC upon contention-free random access (CFRA).

(Method 1)

When a user terminal is commanded UL transmission in a TCC from a PCC and/or an SCC (for example, by using the PUCCH), the user can operate not to read (detect) the PHICH that corresponds to the PUSCH scheduled for the TCC. Meanwhile, the user terminal can detect the PHICHs that correspond to the PUSCHs scheduled for the PCC and/or the SCC as in existing systems and execute retransmission control.

In this case, the radio base station can attach information about HARQ process numbers (for example, three bits) to UL grants scheduled for the TCC. Meanwhile, it is also possible to use a structure in which information about HARQ process numbers is not attached to UL grants scheduled for the PCC and/or the SCC.

Consequently, in the PCC and/or the SCC, the user terminal uses synchronous HARQ by using the PHICH, and uses asynchronous HARQ in the TCC. By this means, in the PCC and/or the SCC, it is possible to reduce the volume of information with UL grants, and reduce the PDCCH overhead.

(Method 2)

When the user terminal is commanded UL transmission in the TCC from the PCC and/or the SCC, the user terminal can operate not to read (detect) the PHICH that corresponds to the PUSCH scheduled for the TCC. Similarly, the user terminal can operate not to read (detect) the PHICHs that correspond to the PUSCHs scheduled for the PCC and/or the SCC either.

In this case, the radio base station can attach information about HARQ process numbers (for example, three bits) to UL grants that are scheduled for the PCC, the SCC and the TCC.

Also, in this case, the UL grants to transmit in the PCC, the SCC and the TCC can be made the same size (the same bit length), so that the search space can be shared. That is, when the user terminal applies blind decoding to downlink control information (for example, a UL grant), the user terminal can detect the downlink control information for the PCC, the SCC and the TCC all together.

Also, when information about HARQ process numbers is attached to UL grants for the PCC and/or the SCC and a CC other than the TCC (PCC and/or SCC) is scheduled, predetermined bit values (for example, a fixed value of 0) may be configured. Based on the HARQ process numbers (for example, fixed values) for UL grants for the PCC and/or the SCC, the user terminal the user terminal can execute retransmission control at a predetermined later timing, as when using the PHICH.

THIRD EXAMPLE

A UL allocation method to take LBT results in an unlicensed band (TCC) into consideration will be described with a third example.

In the event a TCC is an unlicensed band, even when a radio base station (eNB) assigns UL transmission (for example, a PUSCH) to a user terminal, the user terminal is limited from making UL transmission if LBT in the TCC yields a result of (LBT_busy).

Consequently, according to the present embodiment, the radio base station allocates resources (for example, PUSCH resources, PUCCH resources, and so on) for a plurality of TCCs from one CC, at the same time. That is, when the user terminal is commanded UL transmission in a TCC, the user terminal can make UL transmission by using a TCC that is capable of transmission (LBT_idle) among a plurality of TCCs.

Figure 11:
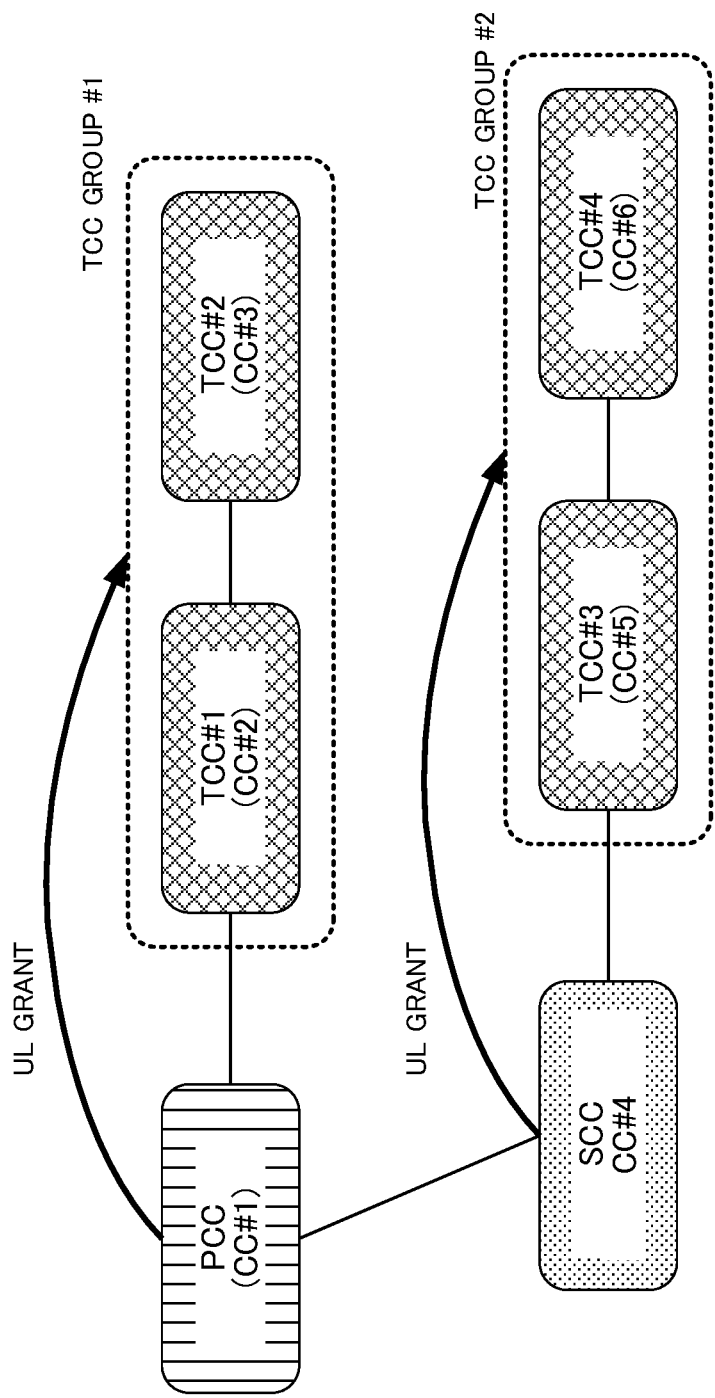
FIG. 11 is a diagram to show an example of a UL transmission method using TCCs.

The radio base station can link between the CCs for the user terminal in advance. For example, as shown in FIG. 11, TCC group #1, which includes a plurality of TCCs #1 and #2 (CCs #2 and #3), is associated with the PCC (CC #1). Alternatively, TCC group #2, which includes a plurality of TCCs #3 and #4 (CCs #5 and #6), is associated with an SCC (CC #4). Information about the associations between CCs can be reported from the radio base station to the user terminal.

The radio base station transmits information about UL signal allocation (for example, a UL grant) from the PCC (CC #1) to TCC group #1, to the user terminal. In this case, the user terminal executes LBT in TCC group #1 (a plurality of TCCs #1 and #2), which is associated with the PCC. Then, the user terminal can make UL transmission by using a TCC where transmission is possible (LBT_idle), among a plurality of TCCs.

Alternatively, the radio base station transmits information about UL signal allocation (for example, a UL grant) from the SCC (CC #4) to TCC group #2, to the user terminal. In this case, the user terminal executes LBT in TCC group #2 (a plurality of TCCs #3 and #4), which is associated with the SCC. Then, the user terminal can make UL transmission by using a TCC where transmission is possible (LBT_idle), among a plurality of TCCs.

When there are multiple TCCs where transmission is possible (LBT_idle) among the TCC groups, the user terminal can select a specific TCC based on predetermined conditions and make UL transmission. For example, the user terminal can make UL transmission by selecting a TCC with a small cell index (cell Index/SCell index) (or a TCC with a large cell index), or by selecting a TCC with good communication quality (for example, received quality, channel quality, etc.). Alternatively, the user terminal may make UL transmission by using a plurality of TCCs where transmission is possible (LBT_idle). In this case, a transmit diversity effect can be achieved.

The radio base station can perform receiving operations, assuming uplink signals (PUSCH) from the user terminal, for a plurality of TCCs (for example, both of TCCs #1 and #2). By this means, even when the result of uplink LBT in every TCC cannot be learned on the radio base station end, it is still possible to receive UL data from the user terminal adequately.

FOURTH EXAMPLE

A UL reporting operation to take LBT results in an unlicensed band (TCC) into consideration will be described with a fourth example.

Figure 12:
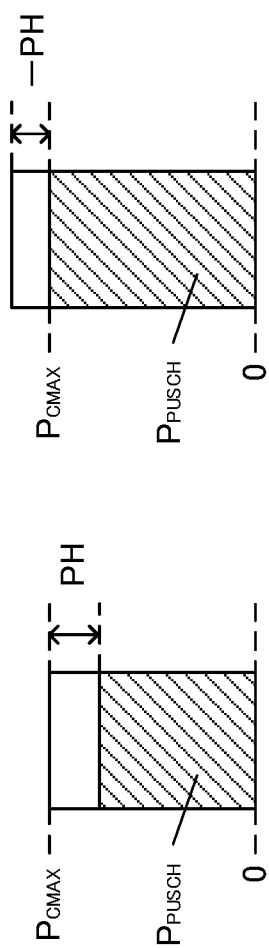
FIG. 12 provide diagrams to show conceptual diagram of power headroom.

In uplink CA in an existing system (Rel. 10 to 12), when transmission takes place in a CC (the PCC and/or an SCC), a user terminal reports power headroom (PH), which indicates extra transmission power, to the radio base station. FIG. 12 show conceptual diagrams of power headroom. Note that FIG. 12 show the transmission power for the PUSCH.

As shown in FIG. 12A, when the user terminal's transmission power $P_{PUSCH}$ does not reach the maximum transmission power $P_{CMAX}$, the user terminal reports the value that is given by subtracting the transmission power $P_{PUSCH}$ from the maximum transmission power $P_{CMAX}$ as the value of extra transmission power PH. Also, when, as shown in FIG. 12B, the user terminal's transmission power $P_{PUSCH}$ exceeds the maximum transmission power $P_{CMAX}$, the user terminal makes the transmission power the value of the maximum transmission power $P_{CMAX}$, and, for the value of extra transmission power PH, reports a negative value, based on following equation 1:

$$PH_{Type1,c}(i) = P_{CMAX,c}(i) - \{10 \log_{10}(M_{PUSCH,c}(i)) + P_{O\_PUSCH,c}(j) + \alpha_c(j) \cdot PL_c + \Delta_{TF,c}(i) + f_c(i)\}$$ (Equation 1)

The user terminal feeds back a PHR (Power Headroom Report), which is for reporting the user terminal's extra transmission power, to the radio base station. The PHR is comprised of a PH, which is information to show the difference between the user terminal's transmission power $P_{PUSCH}$ and the maximum transmission power $P_{CMAX}$, and a two-bit reserved field. Note that, for the PH, a type 1 and a type 2 are supported, where the type 1 PH is the PH for use when assuming that the PUSCH alone is communicated, and the type 2 PH is the PH for use when assuming that the PUSCH and the PUCCH are communicated.

In an existing system, the user terminal reports information about a real PHR that takes the actual transmission power into consideration, for a CC that makes UL transmission, and reports information about a virtual PHR for a CC that does not make UL transmission. Virtual PH (VPH) corresponds to PH that does not rely on the PUSCH bandwidth, and a PHR that includes virtual PH is also referred to as a "virtual PHR."

The user terminal includes the information about a real PHR and a virtual PHR in a MAC CE, and reports this to the radio base station by using the PUSCH of the CC that makes UL transmission. The radio base station receives information about a virtual PHR, in addition to the real PHR, and therefore can take the total extra transmission power into consideration, including uplink transmission power control for CCs where transmission does not take place.

In the event a TCC is an unlicensed band, even when allocation for UL transmission is commanded, UL transmission is limited depending on the result of LBT. Consequently, assuming that the same control is applied as in existing systems, even if UL transmission in the TCC is assigned, the user terminal reports a virtual PHR to the TCC if transmission is limited based on the LBT result. In this case, for this TCC, a virtual PHR is reported from the user terminal to the radio base station end, so that it is difficult to learn accurate UL transmission power.

Also, when the user terminal executes LBT shortly before UL transmission, there is a threat that the result of LBT becomes clear only immediately before the UL transmission is carried out. In this case, even if the user terminal intends to make UL transmission in the TCC and prepares a MAC CE by using information about a real PHR, the user terminal needs to prepare a virtual PHR when the result of LBT yields LBT_busy. Also, in this case, there is also a threat that the user terminal cannot change the information to transmit (real PHR→virtual PHR) in time.

Consequently, with the present embodiment, the user terminal can be controlled to transmit information about a predetermined PHR regardless of the result of LBT for UL transmission in a TCC. By this means, even when UL transmission in a TCC is limited (LBT_busy), the user terminal still can generate and transmit information about PHRs adequately. The user terminal may report the type of PHR-related information (for example, a real PHR or a virtual PHR) to generate and transmit, to the radio base station, in advance. Alternatively, the radio base station may configure the type of PHRs to transmit from the user terminal in advance.

For example, even when UL transmission is limited (LBT_busy) in a TCC, the user terminal still can report a real PHR to the TCC. In this case, this TCC's UL signal is already allocated from the radio base station to the user terminal, so that the user terminal can calculate and report a real PHR.

Note that the user terminal can send a real PHR to a TCC via another CC (for example, the PCC and/or an SCC) where UL transmission is possible. Also, since the user terminal can determine the type of PHRs to report depending on whether or not UL signals are allocated, regardless of the result of LBT, and generate PHRs (generate MAC CEs), so that it is possible to reduce the load of the user terminal.

Alternatively, the user terminal may be structured to always send virtual PHRs to TCCs, or the user terminal may be structured to select the type of PHRs to send (real PHR/virtual PHR).

(Structure of Radio Communication System)

Now, the structure of the radio communication system according to an embodiment of the present invention will be described below. In this radio communication system, the radio communication methods according to the embodiments of the present invention are employed. Note that the radio communication methods of the above-described embodiments may be applied individually or may be applied in combination.

Figure 13:
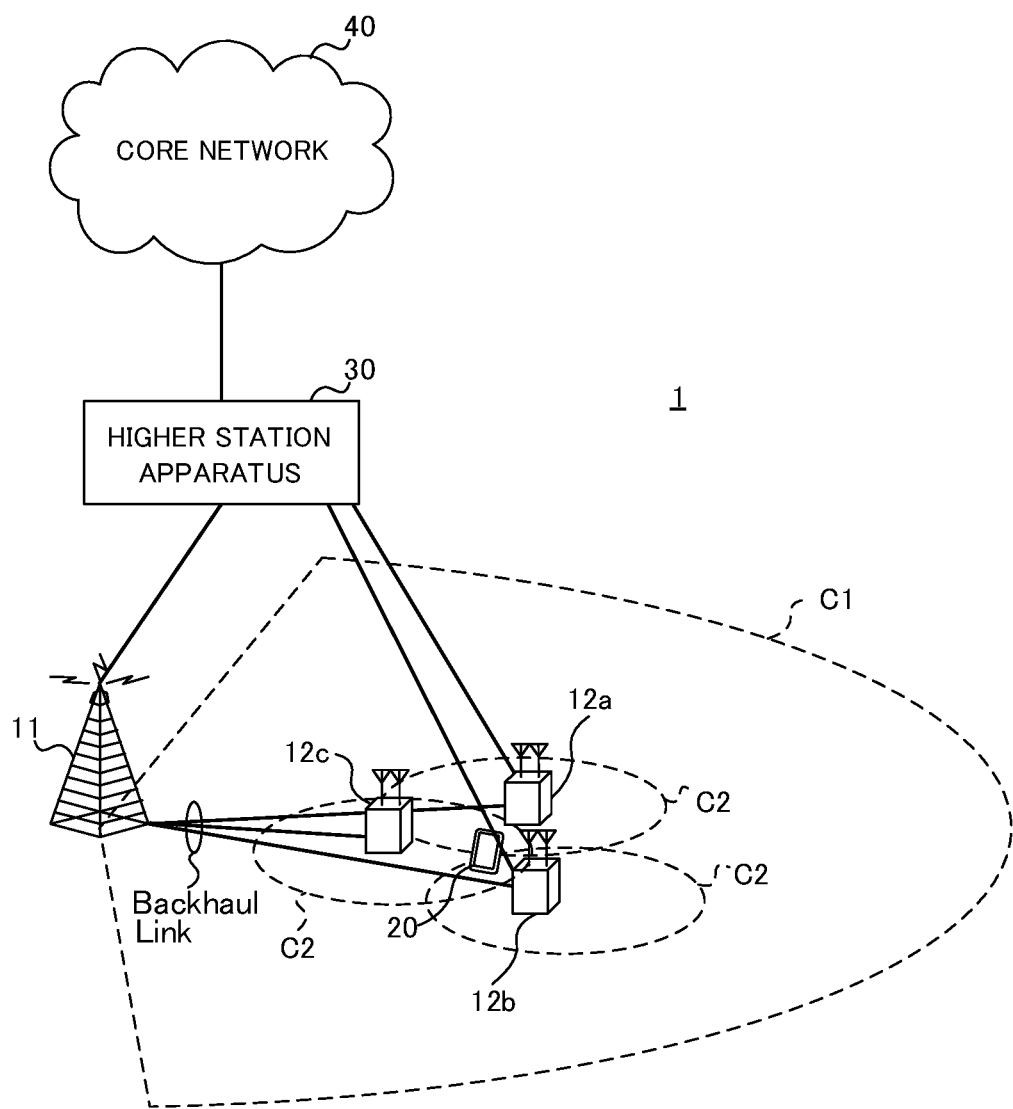
FIG. 13 is a diagram to show an example of a schematic structure of a radio communication system according to the present embodiment.

FIG. 13 is a diagram to show an example of a schematic structure of a radio communication system according to an embodiment of the present invention. Note that the radio communication system shown in FIG. 13 is a system to incorporate, for example, an LTE system, super 3G, an LTE-A system and so on. In this radio communication system, carrier aggregation (CA) and/or dual connectivity (DC) to bundle a plurality of component carriers (PCC, SCC, TCC, etc.) into one can be used. Note that this radio communication system may be referred to as "IMT-Advanced," or may be referred to as "4G," "5G," "FRA" (Future Radio Access) and so on.

The radio communication system 1 shown in FIG. 13 includes a radio base station 11 that forms a macro cell C1, and radio base stations 12a to 12c that form small cells C2, which are placed within the macro cell C1 and which are narrower than the macro cell C1. Also, user terminals 20 are placed in the macro cell C1 and in each small cell C2.

The user terminals 20 can connect with both the radio base station 11 and the radio base stations 12. The user terminals 20 may use the macro cell C1 and the small cells C2, which use different frequencies, at the same time, by means of CA or DC. Also, the user terminals 20 can execute CA or DC by using at least six or more CCs (cells). For example, it is possible to configure, in the user terminal, the macro cell C1 as the PCell (PCC) and the small cells C2 as SCells (SCCs) and/or TCells (TCCs). Also, for TCCs, licensed bands and/or unlicensed bands can be configured.

Between the user terminals 20 and the radio base station 11, communication is carried out using a carrier of a relatively low frequency band (for example, 2 GHz) and a narrow bandwidth (referred to as, for example, "existing carrier," "legacy carrier" and so on). Meanwhile, between the user terminals 20 and the radio base stations 12, a carrier of a relatively high frequency band (for example, 3.5 GHz, 5 GHz and so on) and a wide bandwidth may be used, or the same carrier as that used in the radio base station 11 may be used. Between the radio base station 11 and the radio base stations 12 (or between two radio base stations 12), wire connection (optical fiber, the X2 interface, etc.) or wireless connection may be established.

The radio base station 11 and the radio base stations 12 are each connected with a higher station apparatus 30, and are connected with a core network 40 via the higher station apparatus 30. Note that the higher station apparatus 30 may be, for example, an access gateway apparatus, a radio network controller (RNC), a mobility management entity (MME) and so on, but is by no means limited to these. Also, each radio base station 12 may be connected with higher station apparatus 30 via the radio base station 11.

Note that the radio base station 11 is a radio base station having a relatively wide coverage, and may be referred to as a "macro base station," a "central node," an "eNB" (eNodeB), a "transmitting/receiving point" and so on. Also, the radio base stations 12 are radio base stations having local coverages, and may be referred to as "small base stations," "micro base stations," "pico base stations," "femto base stations," "HeNBs" (Home eNodeBs), "RRHs" (Remote Radio Heads), "transmitting/receiving points" and so on. Hereinafter the radio base stations 11 and 12 will be collectively referred to as "radio base stations 10," unless specified otherwise. The user terminals 20 are terminals to support various communication schemes such as LTE, LTE-A and so on, and may be either mobile communication terminals or stationary communication terminals.

In the radio communication system, as radio access schemes, OFDMA (Orthogonal Frequency Division Multiple Access) is applied to the downlink, and SC-FDMA (Single-Carrier Frequency Division Multiple Access) is applied to the uplink. OFDMA is a multi-carrier communication scheme to perform communication by dividing a frequency band into a plurality of narrow frequency bands (subcarriers) and mapping data to each subcarrier. SC-FDMA is a single-carrier communication scheme to mitigate interference between terminals by dividing the system band into bands formed with one or continuous resource blocks per terminal, and allowing a plurality of terminals to use mutually different bands. Note that the uplink and downlink radio access schemes are by no means limited to the combination of these.

In the radio communication system 1, a downlink shared channel (PDSCH: Physical Downlink Shared CHannel), which is used by each user terminal 20 on a shared basis, a broadcast channel (PBCH: Physical Broadcast CHannel), downlink L1/L2 control channels and so on are used as downlink channels. User data, higher layer control information and predetermined SIBs (System Information Blocks) are communicated in the PDSCH. Also, MIBs (Master Information Blocks) are communicated in the PBCH.

The downlink L1/L2 control channels include a PDCCH (Physical Downlink Control CHannel), an EPDCCH (Enhanced Physical Downlink Control CHannel), a PCFICH (Physical Control Format Indicator CHannel), a PHICH (Physical Hybrid-ARQ Indicator CHannel) and so on. Downlink control information (DCI) including PDSCH and PUSCH scheduling information is communicated by the PDCCH. The number of OFDM symbols to use for the PDCCH is transmitted by the PCFICH. HARQ delivery acknowledgement signals (ACKs/NACKs) in response to the PUSCH are communicated by the PHICH. The EPDCCH may be frequency-division-multiplexed with the PDSCH (downlink shared data channel) and used to communicate DCI and so on, like the PDCCH.

Also, as downlink reference signals, cell-specific reference signals (CRS: Cell-specific Reference Signals), channel state measurement reference signals (CSI-RS: Channel State Information-Reference Signals), user-specific reference signals (DM-RS: Demodulation Reference Signals) for use for demodulation and others are included.

In the radio communication system 1, an uplink shared channel (PUSCH: Physical Uplink Shared CHannel), which is used by each user terminal 20 on a shared basis, an uplink control channel (PUCCH: Physical Uplink Control CHannel), a random access channel (PRACH: Physical Random Access CHannel) and so on are used as uplink channels. User data and higher layer control information are communicated by the PUSCH. Also, downlink radio quality information (CQI: Channel Quality Indicator), delivery acknowledgment signals (HARQ-ACKs) and so on are communicated by the PUCCH. Random access preambles (RA preambles) for establishing connections with cells are communicated by the PRACH.

<Radio Base Station>

Figure 14:
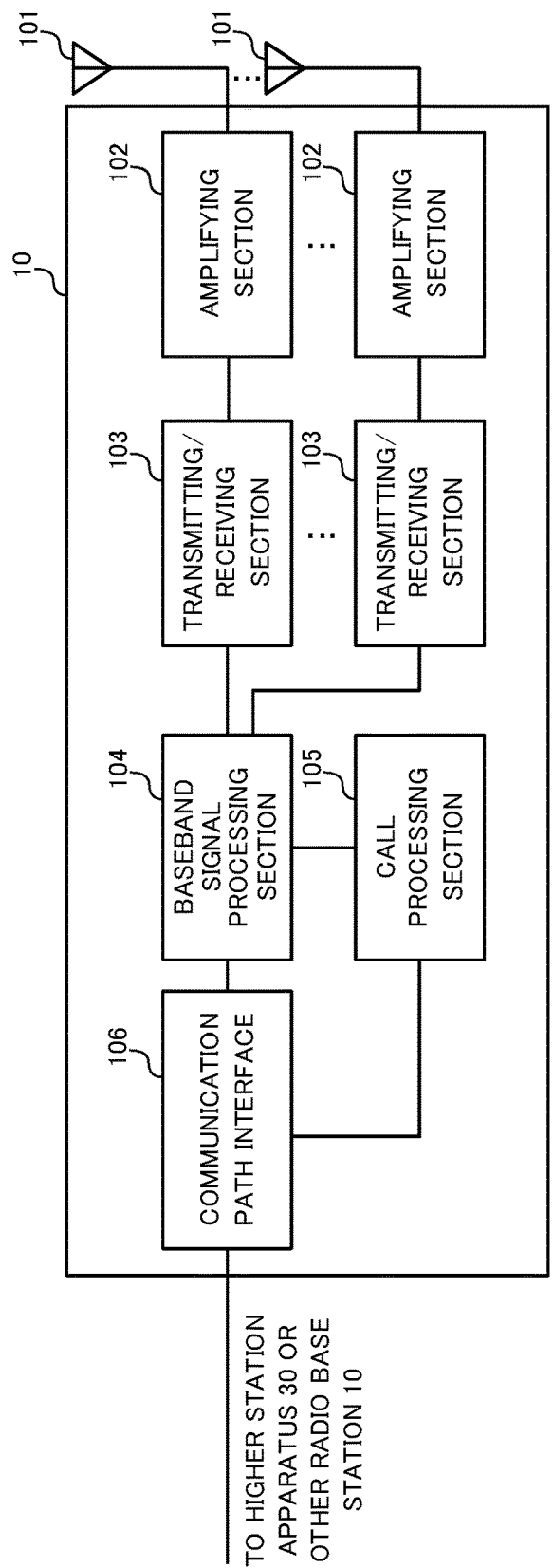
FIG. 14 is a diagram to show an example of an overall structure of a radio base station according to the present embodiment.

FIG. 14 is a diagram to show an example of an overall structure of a radio base station according to one embodiment of the present invention. A radio base station 10 has a plurality of transmitting/receiving antennas 10, amplifying sections 102, transmitting/receiving sections 103, a baseband signal processing section 104, a call processing section 105 and a communication path interface 106. Note that the transmitting/receiving sections 103 are comprised of transmission sections and receiving sections.

User data to be transmitted from the radio base station 10 to a user terminal 20 on the downlink is input from the higher station apparatus 30 to the baseband signal processing section 104, via the communication path interface 106.

In the baseband signal processing section 104, the user data is subjected to a PDCP (Packet Data Convergence Protocol) layer process, user data division and coupling, RLC (Radio Link Control) layer transmission processes such as RLC retransmission control, MAC (Medium Access Control) retransmission control (for example, an HARQ (Hybrid Automatic Repeat reQuest) transmission process), scheduling, transport format selection, channel coding, an inverse fast Fourier transform (IFFT) process and a precoding process, and the result is forwarded to each transmitting/receiving section 103. Furthermore, downlink control signals are also subjected to transmission processes such as channel coding and an inverse fast Fourier transform, and forwarded to each transmitting/receiving section 103.

Each transmitting/receiving section 103 converts baseband signals that are pre-coded and output from the baseband signal processing section 104 on a per antenna basis, into a radio frequency band. The radio frequency signals having been subjected to frequency conversion in the transmitting/receiving sections 103 are amplified in the amplifying sections 102, and transmitted from the transmitting/receiving antennas 101.

For example, the transmitting/receiving sections 103 can transmit information about CCs that execute CA (for example, information about a CC to serve as a TCC, and so on). The transmitting/receiving sections 103 can transmit downlink control information (for example, a UL grant) that commands UL transmission in a TCC. For example, the transmitting/receiving sections 103 may transmit a UL grant for a TCC by using the TCC's downlink control channel (PDCCH/EPDCCH), or by using the PCC's and/or an SCC's downlink control channel (cross carrier scheduling).

Also, when asynchronous UL HARQ is applied to the TCC, the transmitting/receiving sections 103 can include HARQ process numbers for asynchronous HARQ in a UL grant and transmit this to the user terminal (see FIG. 10). Also, the transmitting/receiving sections 103 can transmit UL grants that include radio resources for UL transmission to TCC groups comprised of a plurality of TCCs (see FIG. 11). In this case, the transmitting/receiving sections 103 can perform UL signal receiving processes in each TCC that is included in the same TCC group. For the transmitting/receiving sections 103, transmitters/receivers, transmitting/receiving circuits or transmitting/receiving devices that can be described based on common understanding of the technical field to which the present invention pertains can be used.

Meanwhile, as for uplink signals, radio frequency signals that are received in the transmitting/receiving antennas 101 are each amplified in the amplifying sections 102. Each transmitting/receiving section 103 receives the uplink signals amplified in the amplifying sections 102. The received signals are converted into the baseband signal through frequency conversion in the transmitting/receiving sections 103 and output to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the communication path interface 106. The call processing section 105 performs call processing such as setting up and releasing communication channels, manages the state of the radio base stations 10 and manages the radio resources.

The communication path interface section 106 transmits and receives signals to and from the higher station apparatus 30 via a predetermined interface. The communication path interface 106 transmits and receives signals to and from neighboring radio base stations 10 (backhaul signaling) via an inter-base station interface (for example, optical fiber, the X2 interface, etc.).

Figure 15:
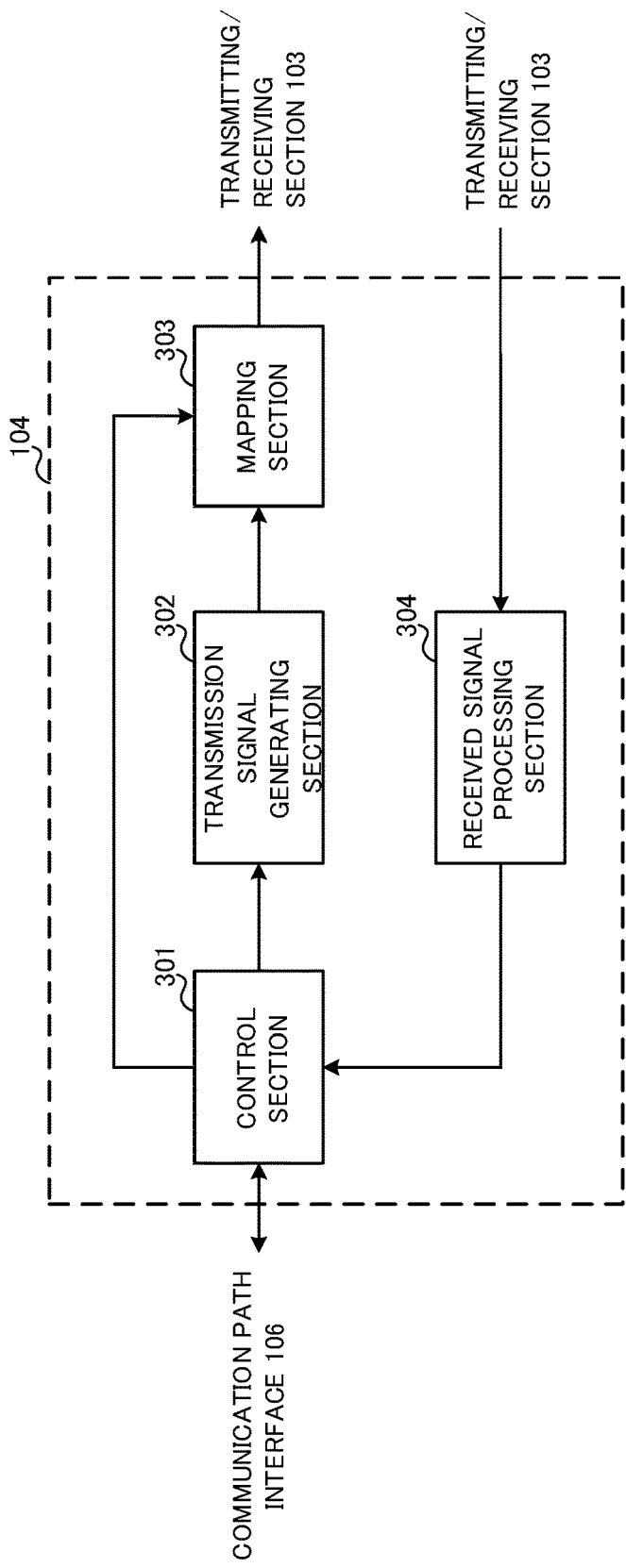
FIG. 15 is a diagram to show an example of a functional structure of a radio base station according to the present embodiment.

FIG. 15 is a diagram to show an example of a functional structure of a radio base station according to the present embodiment. Note that, although FIG. 15 primarily shows functional blocks that pertain to characteristic parts of the present embodiment, the radio base station 10 has other functional blocks that are necessary for radio communication as well. As shown in FIG. 15, the baseband signal processing section 104 has a control section (scheduler) 301, a transmission signal generating section (generating section) 302, a mapping section 303 and a received signal processing section 304.

The control section (scheduler) 301 controls the scheduling of (for example, allocates resources to) downlink data signals that are transmitted in the PDSCH and downlink control signals that are communicated in the PDCCH and/or the EPDCCH. Furthermore, the control section (scheduler) 301 also controls the scheduling of system information, synchronization signals, paging information, CRSs, CSI-RSs and so on.

For an unlicensed CC (for example, a TCC), the control section 301 controls the transmission of DL signals based on the result of DL LBT. When LBT is executed in the unlicensed band (TCC), the control section 301 may control the result of this LBT to be reported to the user terminal in a licensed band (the PCC and/or an SCC).

The control section 301 can apply asynchronous HARQ to the TCC. In this case, the control section 301 can control the transmitting and receiving operations, assuming that the user terminal operates without reading (detecting) ACKs/NACKs for the PHICH (synchronous HARQ operation). Also, when asynchronous UL HARQ is used, the control section 301 can control HARQ process numbers, which represent predetermined UL data, to be attached to UL grants (see FIG. 10).

Also, the control section 301 can control resources to be allocated from one CC (the PCC and/or an SCC) to a plurality of TCCs, at the same time (see FIG. 11). In this case, the control section 301 can link between the CCs in advance for the user terminal, and control information about the associations between the CCs to be reported to the user terminal.

Also, the control section 301 controls the scheduling of uplink reference signals, uplink data signals that are transmitted in the PUSCH, uplink control signals that are transmitted in the PUCCH and/or the PUSCH, random access preambles that are transmitted in the PRACH, and so on. Note that, for the control section 301, a controller, a control circuit or a control device that can be described based on common understanding of the technical field to which the present invention pertains can be used.

The transmission signal generating section 302 generates DL signals based on commands from the control section 301 and outputs these signals to the mapping section 303. For example, the transmission signal generating section 302 generates DL assignments, which report downlink signal allocation information, and UL grants, which report uplink signal allocation information, based on commands from the control section 301. Also, the downlink data signals are subjected to a coding process and a modulation process, based on coding rates and modulation schemes that are determined based on channel state information (CSI) from each user terminal 20 and so on. Note that, for the transmission signal generating section 302, a signal generator, a signal generating circuit or a signal generating device that can be described based on common understanding of the technical field to which the present invention pertains can be used.

The mapping section 303 maps the downlink signals generated in the transmission signal generating section 302 to predetermined radio resources based on commands from the control section 301, and outputs these to the transmitting/receiving sections 103. Note that, for the mapping section 303, mapper, a mapping circuit or a mapping device that can be described based on common understanding of the technical field to which the present invention pertains can be used.

The received signal processing section 304 performs the receiving processes (for example, demapping, demodulation, decoding and so on) of the UL signals that are transmitted from the user terminal (for example, delivery acknowledgement signals (HARQ-ACKs), data signals that are transmitted in the PUSCH, random access preambles that are transmitted in the PRACH, and so on). The processing results are output to the control section 301.

Also, by using the receive signals, the received signal processing section 304 may measure the received power (for example, the RSRP (Reference Signal Received Power)), the received quality (for example, the RSRQ (Reference Signal Received Quality)), channel states and so on. Alternatively, the received signal processing section 304 may execute DL LBT before DL signals are transmitted. Note that the measurement results in the received signal processing section 304 may be output to the control section 301. Note that a measurement section to perform the measurement operations may be provided apart from the received signal processing section 304.

The receiving process section 304 can be constituted by a signal processor, a signal processing circuit or a signal processing device, and a measurer, a measurement circuit or a measurement device that can be described based on common understanding of the technical field to which the present invention pertains.

<User Terminal>

Figure 16:
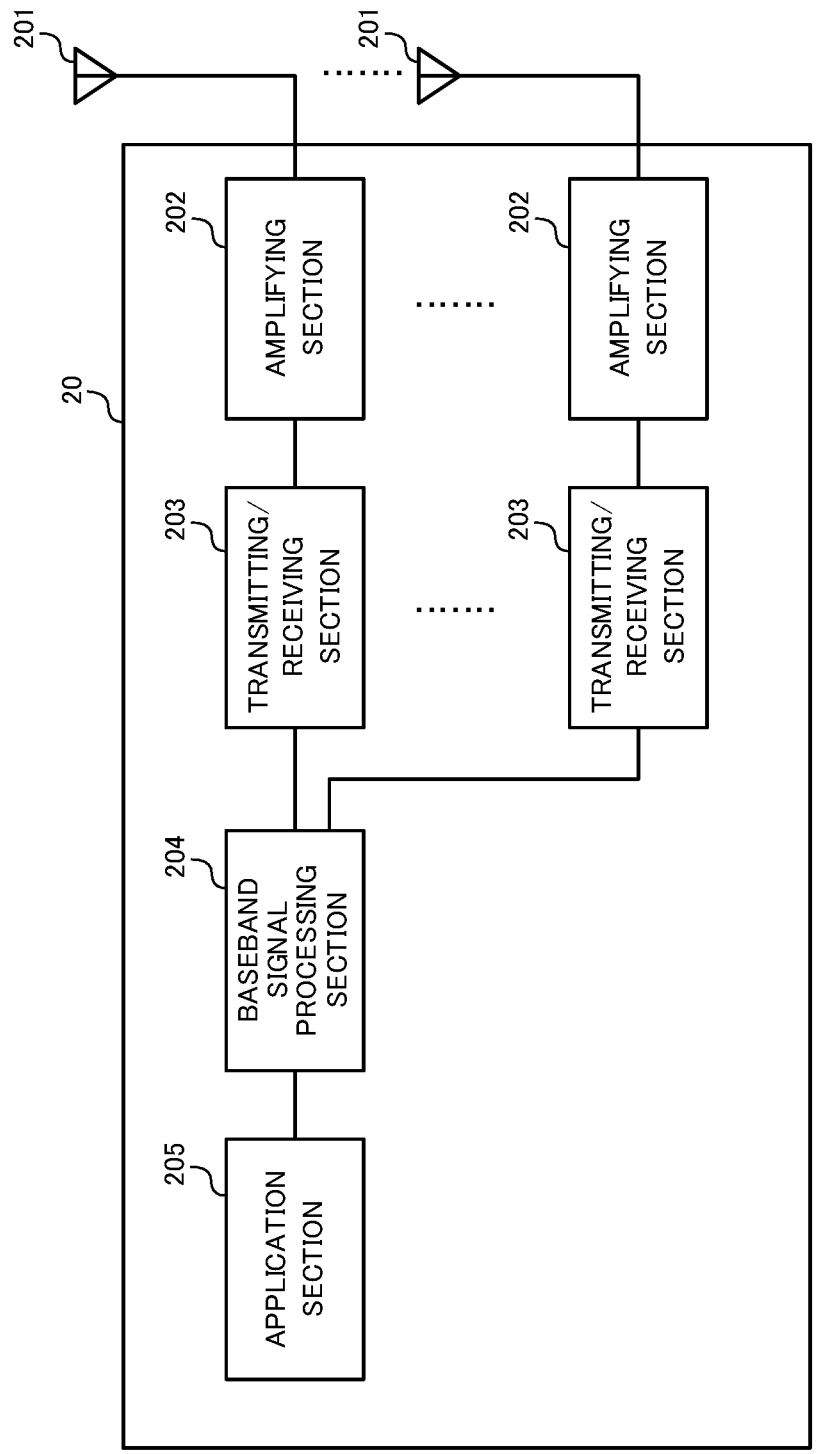
FIG. 16 is a diagram to show an example of an overall structure of a user terminal according to the present embodiment.

FIG. 16 is a diagram to show an example of an overall structure of a user terminal according to the present embodiment. A user terminal 20 has a plurality of transmitting/receiving antennas 201 for MIMO communication, amplifying sections 202, transmitting/receiving sections 203, a baseband signal processing section 204 and an application section 205. Note that the transmitting/receiving sections 203 may be comprised of transmission sections and receiving sections.

Radio frequency signals that are received in a plurality of transmitting/receiving antennas 201 are each amplified in the amplifying sections 202. Each transmitting/receiving section 203 receives the downlink signals amplified in the amplifying sections 202. The received signals are subjected to frequency conversion and converted into the baseband signal in the transmitting/receiving sections 203, and output to the baseband signal processing section 204.

The transmitting/receiving sections 203 receive DL signals, such as downlink control information (for example, a UL grant) that commands UL transmission in a TCC. In this case, the transmitting/receiving sections 203 can receive downlink control information that includes a UL grant for the TCC in the downlink control channels (PDCCH/EPDCCH) of the PCC, an SCC and/or the TCC.

Also, when the transmitting/receiving sections 203 can operate to transmit UL data by using padding bits when judging that there is no UL data that corresponds to the UL grant in the PCC or the SCC, and not to transmit UL data when judging that there is no UL data that correspond to the UL grant in the TCC. In this case, the transmitting/receiving sections 203 may include and transmit information to indicate that no UL data in the TCC corresponds to the UL grant, in the PCC's and/or the SCC's UL signal (see FIG. 8).

Also, the transmitting/receiving sections 203 can report the user terminal's capability information (capability) to the radio base station. For example, the transmitting/receiving sections 203 transmits information about TCCs that can be used at the same time (for example, information about the combination of TCCs), in addition to information about the frequencies in which TCCs can be used, to the radio base station. Note that, for the transmitting/receiving sections 203, transmitters/receivers, transmitting/receiving circuits or transmitting/receiving devices that can be described based on common understanding of the technical field to which the present invention pertains can be used.

In the baseband signal processing section 204, the baseband signals that are input are subjected to an FFT process, error correction decoding, a retransmission control receiving process, and so on. Downlink user data is forwarded to the application section 205. The application section 205 performs processes related to higher layers above the physical layer and the MAC layer, and so on. Furthermore, in the downlink data, broadcast information is also forwarded to the application section 205.

Meanwhile, uplink user data is input from the application section 205 to the baseband signal processing section 204. The baseband signal processing section 204 performs a retransmission control transmission process (for example, an HARQ transmission process), channel coding, pre-coding, a discrete Fourier transform (DFT) process, an IFFT process and so on, and the result is forwarded to each transmitting/receiving section 203. The baseband signal that is output from the baseband signal processing section 204 is converted into a radio frequency band in the transmitting/receiving sections 203. The radio frequency signals that are subjected to frequency conversion in the transmitting/receiving sections 203 are amplified in the amplifying sections 202, and transmitted from the transmitting/receiving antennas 201.

Figure 17:
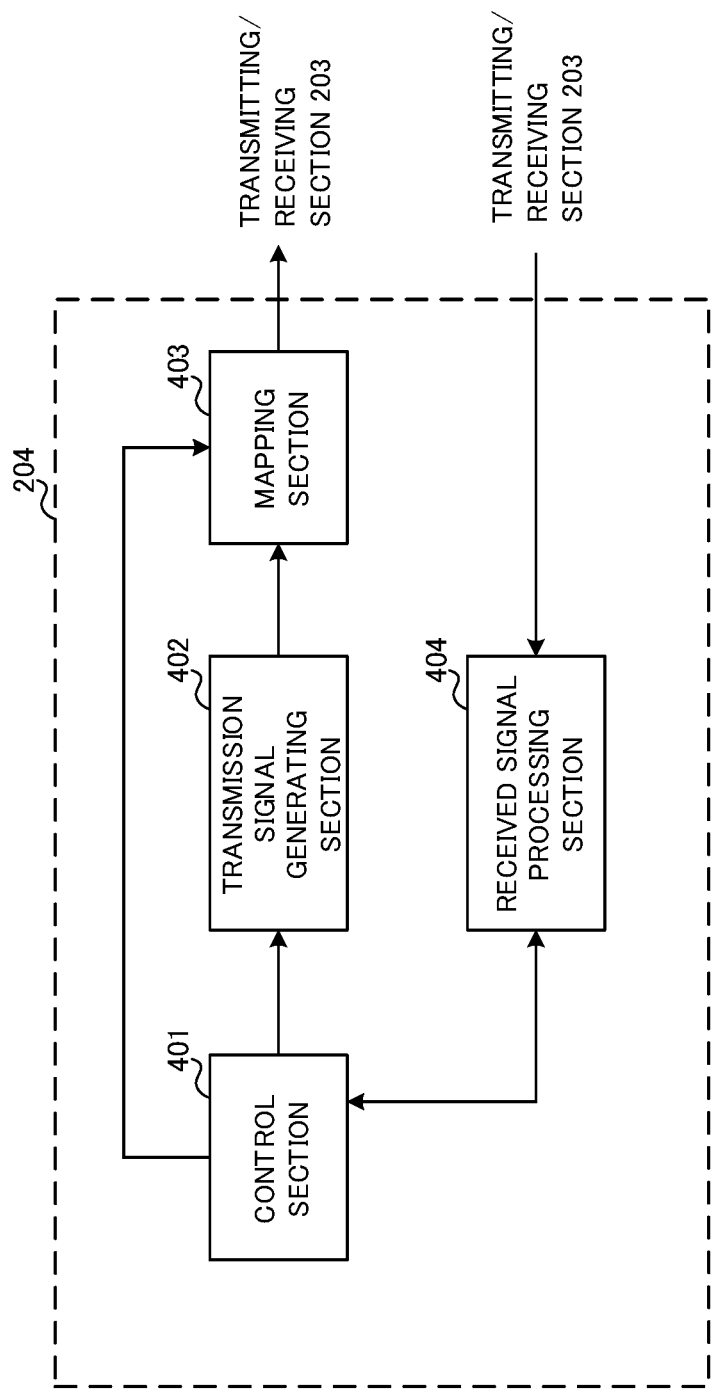
FIG. 17 is a diagram to show an example of a functional structure of a user terminal according to the present embodiment.

FIG. 17 is a diagram to show an example of a functional structure of a user terminal according to the present embodiment. Note that, although FIG. 17 primarily shows functional blocks that pertain to characteristic parts of the present embodiment, the user terminal 20 has other functional blocks that are necessary for radio communication as well. As shown in FIG. 17, the baseband signal processing section 204 provided in the user terminal 20 has a control section 401, a transmission signal generating section 402, a mapping section 403 and a received signal processing section 404.

The control section 401 acquires the downlink control signals (signals transmitted in the PDCCH/EPDCCH) and downlink data signals (signals transmitted in the PDSCH) transmitted from the radio base station 10, from received signal process section 404. The control section 401 controls the generation of uplink control signals (for example, delivery acknowledgement signals (HARQ-ACKs) and so on) and uplink data signals, based on the downlink control signals, the results of deciding whether or not retransmission control is necessary for the downlink data signals, and so on.

The control section 401 can control the transmission signal generating section 402, the mapping section 403 and the received signal processing section 404. Also, the control section 401 can control the transmitting/receiving sections 203 as well. For example, when the user terminal employs CA that uses TCCs (see FIG. 5 and FIG. 6), the control section 401 can apply, to the TCCs, UL signal transmission operations that are different from those of the PCC and/or the SCCs.

For example, when judging that there is no UL data that corresponds to a UL grant in the PCC or the SCCs, the control section 401 controls UL data to be transmitted by using padding bits. Also, when judging that there is no UL data that correspond to the UL grant in the TCC, the control section 401 can control UL data not to be transmitted (see FIG. 8).

Also, the control section 401 can apply asynchronous HARQ to a UL signal transmitted in a TCC (see FIG. 10). When a UL grant to command UL signal transmission in a TCC is received in the transmitting/receiving sections 203, the control section 401 can control PHICH detection not to be carried out in the TCC. Also, the control section 401 can apply retransmission control to a UL signal transmitted in a TCC based on the HARQ process numbers included in the UL grant.

Also, when a UL grant to command UL signal transmission in a TCC is received in the transmitting/receiving sections 203, the control section 401 can execute listening with respect to multiple TCCs that are configured in advance, and, based on the results of listening, transmit UL signals in a predetermined TCC (see FIG. 11).

Also, as a PHR (Power Headroom Report) for a TCC, the control section 401 can control a predetermined PHR (for example, a real PHR) to be reported to the radio base station regardless of the result of listening.

For the control section 401, a controller, a control circuit or a control device that can be described based on common understanding of the technical field to which the present invention pertains can be used.

The transmission signal generating section 402 generates UL signals based on commands from the control section 401 and outputs these signals to the mapping section 403. For example, the transmission signal generating section 402 generates uplink control signals such as delivery acknowledgement signals (HARQ-ACKs), channel state information (CSI) and so on, based on commands from the control section 401.

Also, the transmission signal generating section 402 generates uplink data signals based on commands from the control section 401. For example, when judging that there is no UL data that corresponds to a UL grant in a TCC, the transmission signal generating section 402 can operate not to generate UL data (padding bits). Also, the transmission signal generating section 402 generates uplink data signals for retransmission based on commands from the control section 401 (for example, HARQ process numbers included in a UL grant). For the transmission signal generating section 402, a signal generator, a signal generating circuit or a signal generating device that can be described based on common understanding of the technical field to which the present invention pertains can be used.

The mapping section 403 maps the uplink signals (uplink control signals and/or uplink data) generated in the transmission signal generating section 402 to radio resources based on commands from the control section 401, and output the result to the transmitting/receiving sections 203. For the mapping section 403, a mapper, a mapping circuit or a mapping device that can be described based on common understanding of the technical field to which the present invention pertains can be used.

The received signal processing section 404 performs the receiving processes (for example, demapping, demodulation, decoding and so on) of the DL signals (for example, downlink control signals that are transmitted from the radio base station in the PDCCH/EPDCCH, downlink data signals transmitted in the PDSCH, and so on). The received signal processing section 404 outputs the information received from the radio base station 10, to the control section 401. The received signal processing section 404 outputs, for example, broadcast information, system information, RRC signaling, DCI and so on, to the control section 401.

The received signal processing section 404 can control the DL signal receiving operations based on commands from the control section 401. For example, when asynchronous UL HARQ is applied to a TCC and a UL grant to command UL signal transmission in the TCC is received, the received signal processing section 404 can operate not to carry out PHICH detection in the TCC.

Also, by using the receive signals, the received signal processing section 404 may measure the received power (for example, the RSRP (Reference Signal Received Power)), the received quality (RSRQ (Reference Signal Received Quality)), channel states and so on. Alternatively, the received signal processing section 404 may execute UL LBT before UL signals are transmitted. The measurement results in the received signal processing section 404 may be output to the control section 401. Note that a measurement section to perform the measurement operations may be provided apart from the received signal processing section 404.

The receiving process section 404 can be constituted by a signal processor, a signal processing circuit or a signal processing device, and a measurer, a measurement circuit or a measurement device that can be described based on common understanding of the technical field to which the present invention pertains.

Note that the block diagrams that have been used to describe the above embodiments show blocks in functional units. These functional blocks (components) may be implemented in arbitrary combinations of hardware and software. Also, means for implementing each functional block is not particularly limited. That is, each functional block may be implemented with one physically-integrated device, or may be implemented by connecting two physically separate devices via radio or wire and using these multiple devices.

For example, part or all of the functions of radio base stations 10 and user terminals 20 may be implemented using hardware such as ASICs (Application-Specific Integrated Circuits), PLDs (Programmable Logic Devices), FPGAs (Field Programmable Gate Arrays), and so on. Also, the radio base stations 10 and the user terminals 20 may be implemented with a computer device that includes a processor (CPU), a communication interface for connecting with networks, a memory and a computer-readable storage medium that holds programs.

Here, the processor and the memory are connected with a bus for communicating information. Also, the computer-readable recording medium is a storage medium such as, for example, a flexible disk, an opto-magnetic disk, a ROM, an EPROM, a CD-ROM, a RAM, a hard disk and so on. Also, the programs may be transmitted from the network through, for example, electric communication channels. Also, the radio base stations 10 and the user terminals 20 may include input devices such as input keys and output devices such as displays.

The functional structures of radio base stations 10 and user terminals 20 may be implemented with the above-described hardware, may be implemented with software modules that are executed on the processor, or may be implemented with combinations of both. The processor controls the whole of the user terminals by running an operating system. Also, the processor reads programs, software modules and data from the storage medium into the memory, and executes various types of processes. Here, these programs have only to be programs that make a computer execute each operation that has been described with the above embodiments. For example, the control section 401 of the user terminals 20 may be stored in the memory and implemented by a control program that operates on the processor, and other functional blocks may be implemented likewise.

Now, although the present invention has been described in detail above, it should be obvious to a person skilled in the art that the present invention is by no means limited to the embodiments described herein. For example, the above-described embodiments may be used individually or in combinations. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way.

The disclosure of Japanese Patent Application No. 2015-030785, filed on Feb. 19, 2015, including the specification, drawings and abstract, is incorporated herein by reference in its entirety.

The invention claimed is:

1. A user terminal that communicates with a radio base station by means of carrier aggregation using a plurality of component carriers (CCs), the user terminal comprising:

a receiver that receives downlink (DL) signals transmitted from each of the CCs;

a transmitter that transmits uplink (UL) signals; and a processor that, when the user terminal is configured with a secondary CC where listen-before-talk (LBT) is applied before transmission and when the user terminal receives downlink control information for scheduling the UL signal in the secondary CC, computes Power Headroom (PH) irrespective of a listening result of the LBT, wherein the processor computes the PH based on a case in which the user terminal transmits the UL signal by a Physical Uplink Shared Channel (PUSCH), and when the receiver receives the downlink control information, the processor controls not to detect a Physical Hybrid-ARQ Indicator Channel (PHICH) in the secondary CC.

2. A radio communication method in a user terminal that communicates with a radio base station by means of carrier aggregation using a plurality of component carriers (CCs), the radio communication method comprising the steps of:

receiving downlink (DL) signals transmitted from each of the CCs; and transmitting an uplink (UL) signal, when the user terminal is configured with a secondary CC where listen-before-talk (LBT) is applied before transmission and when the user terminal receives downlink control information for scheduling the UL signal in the secondary CC, computing Power Headroom (PH) irrespective of a listening result of the LBT, wherein the user terminal computes the PH based on a case in which the user terminal transmits the UL signal by a Physical Uplink Shared Channel (PUSCH), and when the user terminal receives the downlink control information, the user terminal controls not to detect a Physical Hybrid-ARQ Indicator Channel (PHICH) in the secondary CC.

3. The user terminal according to claim 1, wherein the processor controls retransmission of the UL signal transmitted in the secondary CC, based on a Hybrid Automatic Repeat Request (HARQ) process number included in the downlink control information.

\* \* \* \* \*